United States Patent
Ishiwaka

(10) Patent No.: US 11,494,640 B2
(45) Date of Patent: Nov. 8, 2022

(54) INFORMATION PROCESSING APPARATUS, INFORMATION PROCESSING METHOD, AND PROGRAM

(71) Applicant: SOFTBANK CORP., Tokyo (JP)

(72) Inventor: Yuko Ishiwaka, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 635 days.

(21) Appl. No.: 16/603,686

(22) PCT Filed: Apr. 10, 2017

(86) PCT No.: PCT/JP2017/014710
§ 371 (c)(1),
(2) Date: Oct. 8, 2019

(87) PCT Pub. No.: WO2018/189791
PCT Pub. Date: Oct. 18, 2018

(65) Prior Publication Data
US 2021/0089881 A1    Mar. 25, 2021

(51) Int. Cl.
*G06N 3/08* (2006.01)
*G06N 3/04* (2006.01)

(52) U.S. Cl.
CPC ............. *G06N 3/08* (2013.01); *G06N 3/0472* (2013.01)

(58) Field of Classification Search
CPC ........... G06N 3/08; G06N 3/0472; G06N 3/04
See application file for complete search history.

(56) References Cited

U.S. PATENT DOCUMENTS

| | | | |
|---|---|---|---|
| 5,621,862 | A | 4/1997 | Nakahira et al. |
| 5,732,697 | A | 3/1998 | Zhang et al. |

(Continued)

FOREIGN PATENT DOCUMENTS

| | | | |
|---|---|---|---|
| JP | H0822446 A | 1/1996 | |
| JP | H0855098 A | 2/1996 | |

(Continued)

OTHER PUBLICATIONS

International Search Report issued in International Application No. PCT/JP2017/014711, dated Jul. 4, 2017, with English translation (5 pages).

(Continued)

*Primary Examiner* — Huyen X Vo
(74) *Attorney, Agent, or Firm* — McDermott Will & Emery LLP

(57) ABSTRACT

In order to address a conventional problem that there is no information processing apparatus for simulating processing in the brain, an information processing apparatus is configured such that one or more pieces of feature information are transferred between somas, each soma may fire using one or more pieces of accepted feature information, a firing pattern, which is a pattern of firing of one or more somas, is acquired, and output information corresponding to the firing pattern is acquired and output. Accordingly, it is possible to realize information processing for simulating processing in the brain. Also, it is possible to realize information processing for simulating processing in the brain, such as growth processing, apoptosis processing, and learning processing of elements such as somas.

21 Claims, 14 Drawing Sheets

(56) References Cited

U.S. PATENT DOCUMENTS

| | | | |
|---|---|---|---|
| 9,020,870 B1* | 4/2015 | Daily | B25J 9/00 706/20 |
| 2008/0258767 A1 | 10/2008 | Snider et al. | |
| 2012/0109866 A1 | 5/2012 | Modha | |
| 2012/0233164 A1 | 9/2012 | Rowe et al. | |
| 2013/0159232 A1 | 6/2013 | Rhodes | |
| 2015/0106310 A1* | 4/2015 | Birdwell | G06N 3/086 706/26 |
| 2015/0106316 A1 | 4/2015 | Birdwel et al. | |
| 2015/0371149 A1 | 12/2015 | Iso | |
| 2016/0042270 A1 | 2/2016 | Narcross | |
| 2017/0004399 A1 | 1/2017 | Kasahara | |

FOREIGN PATENT DOCUMENTS

| | | |
|---|---|---|
| JP | H9-179843 A | 7/1997 |
| JP | 2001014293 A | 1/2001 |
| JP | 2001-119425 A | 4/2001 |
| JP | 2005-348872 A | 12/2005 |
| JP | 2009-522684 A | 6/2009 |
| JP | 2009230337 A | 10/2009 |
| JP | 2010525447 A | 7/2010 |
| JP | 2012014617 A | 1/2012 |
| JP | 2013546064 A | 12/2013 |
| JP | 2014-113620 A | 6/2014 |
| JP | 2016004547 A | 1/2016 |
| JP | 2016047239 A | 4/2016 |
| JP | 2016052430 A | 4/2016 |
| JP | 2017016414 A | 1/2017 |
| WO | 2007/081307 A1 | 7/2007 |

OTHER PUBLICATIONS

Notice of Reasons for Refusal dated Jan. 5, 2021 in Japanese Patent Application No. 2019-512069, with English machine translation (9 pages).

International Search Report issued in International Application No. PCT/JP2017/014712, dated May 16, 2017, with English translation (4 pages).

Notice of Reasons for Refusal issued in corresponding Japanese Patent Application No. 2019-512070, dated May 19, 2020, with English language translation (6 pages).

Notice of Reasons for Refusal dated Jan. 5, 2021 in Japanese Patent Application No. 2019-512068, with English machine translation.

International Search Report issued in International Patent Application No. PCT/JP2017/014710, dated Jul. 4, 2017, with English translation.

Chihiro Ikuta et al., "Multi-Layer Perceptron Having Neuro-Glia Network", IEICE Technical Report, Jul. 5, 2010 (Jul. 5, 2010), vol. 110, No. 122, p. 13 to 17.

Ryusuke Kurino et al., "Growing neural network with generation of hidden neurons", IEICE Technical Report, Mar. 12, 2004 (Mar. 12, 2004), vol. 103, No. 734, p. 109 to 114.

Office Action issued in corresponding U.S. Appl. No. 16/603,702 dated Aug. 30, 2022 (9 pages).

* cited by examiner

INFORMATION PROCESSING APPARATUS, INFORMATION PROCESSING METHOD, AND PROGRAM

CROSS-REFERENCE OF RELATED APPLICATIONS

This application is the U.S. National Phase under 35 U.S.C. § 371 of International Patent Application No. PCT/JP2017/014710, filed on Apr. 10, 2017, the entire disclosures of which Applications are incorporated by reference herein.

TECHNICAL FIELD

The present invention relates to an information processing apparatus and the like capable of performing information processing for simulating information processing in the brain.

BACKGROUND ART

Conventionally, there are brain wave signal processing apparatuses for acquiring and processing brain wave signals representing brain waves of a subject (see Patent Documents 1 and 2, for example).

CITATION LIST

Patent Documents

Patent Document 1: JP 2016-47239A
Patent Document 2: JP 2016-52430A

SUMMARY OF INVENTION

Technical Problem

However, in conventional techniques, it is not possible to perform information processing for simulating processing in the brain.

Solution to Problem

A first aspect of the present invention is directed to an information processing apparatus including: a soma-related information storage unit in which two or more pieces of soma-related information having a soma identifier for identifying a soma, and firing condition information related to a condition for the soma to fire are stored; a connection information storage unit in which one or more pieces of connection information for specifying connection between two or more somas are stored; an output management information storage unit in which one or more pieces of output management information having an output condition, which is a condition for output using a firing pattern having one or more soma identifiers, and output information, which is information that is output, are stored; an input information accepting unit that accepts input information; a feature information acquiring unit that acquires one or more pieces of feature information from the input information; an information transfer unit that acquires the one or more pieces of feature information acquired by the feature information acquiring unit and one or more soma identifiers each for identifying a soma that fires first, and acquires one or more pieces of feature information given from one or more other somas or one or more pieces of feature information acquired from the one or more pieces of feature information, and a soma identifier of each of one or more somas that are to be subjected to judgment of firing; a judging unit that, using the one or more pieces of feature information acquired by the information transfer unit, and firing condition information that is paired with the one or more soma identifiers acquired by the information transfer unit, judges whether or not the soma identified with each of the soma identifiers fires; a firing pattern acquiring unit that acquires a firing pattern containing one or more soma identifiers each for identifying a soma judged by the judging unit as a soma that fires; an output information acquiring unit that acquires, from the output management information storage unit, output information corresponding to the firing pattern acquired by the firing pattern acquiring unit; and an information output unit that outputs the output information acquired by the output information acquiring unit, wherein the information transfer unit acquires the soma identifier of each of the one or more somas connected to the soma judged by the judging unit as a soma that fires, using the one or more pieces of feature information applied to soma-related information of the soma judged by the judging unit as a soma that fires or one or more pieces of feature information acquired from the one or more pieces of feature information, and the connection information in the connection information storage unit, and the processing by the judging unit, the processing by the firing pattern acquiring unit, and the processing by the information transfer unit are repeated twice or more.

With this configuration, it is possible to realize an information processing apparatus for simulating processing in the brain.

Furthermore, a second aspect of the present invention is directed to the information processing apparatus according to the first aspect, further including: a firing start point information storage unit in which one or more pieces of firing start point information having an information identifier for identifying feature information, and one or more soma identifiers each for identifying a soma that fires when the feature information is accepted are stored, wherein the information transfer unit includes: a firing start point soma determining part that acquires one or more soma identifiers that are respectively paired with information identifiers for identifying the one or more pieces of feature information acquired by the feature information acquiring unit, from the firing start point information storage unit; a connection detecting part that detects one or more somas connected to a soma judged by the judging unit as a soma that fires, using the connection information in the connection information storage unit; and a transfer information acquiring part that acquires one or more pieces of feature information applied to soma-related information of a soma judged by the judging unit as a soma that fires or one or more pieces of feature information acquired from the one or more pieces of feature information, and soma identifiers of one or more somas detected by the connection detecting part.

With this configuration, it is possible to realize an information processing apparatus for simulating processing in the brain.

Furthermore, a third aspect of the present invention is directed to the information processing apparatus according to the first or second aspect, further including: a soma calculating unit that performs calculation on two or more pieces of feature information given from two or more other somas, thereby acquiring one piece of feature information, wherein the information transfer unit acquires the one or more pieces of feature information acquired by the feature information acquiring unit and one or more soma identifiers each for identifying a soma that fires first, and acquires the one piece of feature information acquired by the soma calculating unit and a soma identifier of each of one or more somas that are to be subjected to judgment of firing.

With this configuration, it is possible to realize an information processing apparatus for simulating calculation processing in a soma in the brain.

Furthermore, a fourth aspect of the present invention is directed to the information processing apparatus according to any one of the first to third aspects, wherein the soma-related information has a soma group identifier for identifying a soma group, which is a group to which a soma belongs, part of the connection information in the connection information storage unit is information for specifying connection between soma groups, each of which is a group of somas, and there is a case in which, using the connection information for specifying connection between a soma group containing a soma judged by the judging unit as a soma that fires and another soma group, the information transfer unit acquires soma identifiers of one or more somas contained in the other soma group.

With this configuration, it is possible to realize an information processing apparatus for simulating information delivery processing between soma groups.

Furthermore, a fifth aspect of the present invention is directed to the information processing apparatus according to any one of the first to fourth aspects, wherein the soma-related information has one or more dendrite identifiers each for identifying a dendrite that realizes information input to a soma, and one or more axon identifiers each for identifying an axon that realizes information output from a soma, and at least some of the one or more pieces of connection information in the connection information storage unit have an axon identifier for identifying an axon of one soma and a dendrite identifier for identifying a dendrite of another soma.

With this configuration, it is possible to realize an information processing apparatus for simulating dendrites and axons in the brain.

Furthermore, a sixth aspect of the present invention is directed to the information processing apparatus according to any one of the first to fifth aspects, wherein the connection information has information transfer probability information related to a probability at which information transfer between one soma and another soma is performed, and the information transfer unit probabilistically acquires the soma identifier of each of the one or more somas connected to the soma judged by the judging unit as a soma that fires, using the information transfer probability information contained in the connection information in the connection information storage unit.

With this configuration, it is possible to realize an information processing apparatus for simulating information transfer processing in the brain.

Furthermore, a seventh aspect of the present invention is directed to the information processing apparatus according to any one of the first to third aspects, wherein the judging unit does not judge that a soma, judged as a soma that has fired, fires, as long as a length of time that has elapsed is not long enough to satisfy a predetermined condition.

With this configuration, it is possible to realize an information processing apparatus for simulating processing in the brain in which a soma that has operated once does not operate as long as the length of time that has elapsed is not long enough to satisfy a predetermined condition.

Furthermore, an eighth aspect of the present invention is directed to the information processing apparatus according to any one of the first to seventh aspects, wherein the firing condition information has firing probability information related to a firing probability the judging unit either judges that a soma fires or judges that the soma does not fire, in a case of judging whether or not the soma fires even using same one or more pieces of feature information and a same piece of firing condition information, and the information processing apparatus further includes a firing probability changing unit that changes a firing probability information corresponding to a soma judged by the judging unit as a soma that fires, so as to increase the firing probability.

With this configuration, it is possible to realize an information processing apparatus for simulating processing in the brain in which a soma that has fired is likely to fire.

Furthermore, a ninth aspect of the present invention is directed to the information processing apparatus according to any one of the first to eighth aspects, wherein the output management information is information that is a pair of an output condition, which is a condition using information related to a firing pattern and one or more pieces of external information that are information of external conditions, and output information, the input information accepting unit accepts one or more pieces of external information, and the output information acquiring unit determines an output condition that matches the one or more soma identifiers acquired by the firing pattern acquiring unit and the one or more pieces of external information accepted by the input information accepting unit, and acquires output information that is paired with the output condition.

With this configuration, it is possible to realize an information processing apparatus for simulating processing in the brain in which, even when the same input information is given, output information varies depending on external information.

Furthermore, a tenth aspect of the present invention is directed to the information processing apparatus according to any one of the first to ninth aspects, further including: a learning condition storage unit in which one or more learning conditions, each of which is a condition for learning using a firing pattern, are stored; a learning information storage unit in which one or more pieces of learning information having input information or one or more pieces of feature information acquired from the input information, and a firing pattern, are stored; a learning detecting unit that detects a learning condition that the firing pattern acquired by the firing pattern acquiring unit matches; and a learning information accumulating unit that, in the case in which the learning detecting unit detects a matching learning condition, accumulates learning information having input information from which the firing pattern acquired by the firing pattern acquiring unit is obtained or one or more pieces of feature information acquired from the input information, and a firing pattern having at least some soma identifiers constituting the firing pattern acquired by the firing pattern acquiring unit, in the learning information storage unit, wherein the firing pattern acquiring unit applies input information accepted by the input information accepting unit or one or more pieces of feature information acquired from the input information to one or more pieces of learning information in the learning information storage unit, thereby acquiring a firing pattern corresponding to the input information or the one or more pieces of feature information acquired from the input information, and the output information acquiring unit acquires output information from the output management information storage unit, also using a firing pattern acquired using the one or more pieces of learning information in the learning information storage unit.

With this configuration, it is possible to realize an information processing apparatus for simulating processing in the brain in which learning of firing patterns is performed.

Furthermore, an eleventh aspect of the present invention is directed to the information processing apparatus according to any one of the first to tenth aspects, further including: a growth unit that performs one or more of soma generation processing for generating soma-related information having a soma identifier, and accumulating the information in the soma-related information storage unit, connection information generation processing for generating connection information, and accumulating the information in the connection information storage unit, and connection information growth processing for growing connection information.

With this configuration, it is possible to realize an information processing apparatus for simulating processing in the brain in which somas and the like grow.

Furthermore, a twelfth aspect of the present invention is directed to the information processing apparatus according to the eleventh aspect, wherein the growth unit performs soma generation processing for generating soma-related information of a divided soma, which is a new soma obtained by dividing a soma judged by the judging unit as a soma that has fired for the number of times or at the frequency that is large enough to satisfy a predetermined condition, and accumulating the information in the soma-related information storage unit, and connection information generation processing for generating connection information for connecting a soma that satisfies the condition and a divided soma, and accumulating the information in the connection information storage unit.

With this configuration, it is possible to realize an information processing apparatus for simulating a growth method of somas and the like in the brain.

Furthermore, a thirteenth aspect of the present invention is directed to the information processing apparatus according to the eleventh or twelfth aspect, further including: a glial cell information storage unit in which one or more pieces of glial cell information having a soma identifier for identifying a soma for connection, or a connection information identifier for identifying connection information for connection are stored, wherein the growth unit performs one or more of soma generation processing for generating soma-related information of a divided soma, which is a new soma obtained by dividing a soma connected to glial cell information that satisfies a predetermined condition, and accumulating the information in the soma-related information storage unit, and connection information growth processing for growing an axon or a dendrite connected to glial cell information that satisfies a predetermined condition.

With this configuration, it is possible to realize an information processing apparatus for simulating glial cells in the brain.

Furthermore, a fourteenth aspect of the present invention is directed to the information processing apparatus according to any one of the eleventh to thirteenth aspects, wherein the soma-related information has soma positional information indicating a position of a soma, one or more pieces of dendrite information, and one or more pieces of axon information, the dendrite information has a dendrite identifier and dendrite positional information indicating a position of a dendrite, the axon information has an axon identifier and axon positional information indicating a position of an axon, at least some of the one or more pieces of connection information in the connection information storage unit have an axon identifier of an axon of one soma and a dendrite identifier of a dendrite of another soma, and the growth unit performs connection information growth processing for changing the axon positional information so as to allow an axon to extend or changing the dendrite positional information so as to allow a dendrite to extend, and, in a case in which axon positional information of an axon of one soma and dendrite positional information of a dendrite of another soma are close to each other enough to satisfy a predetermined condition, performs connection information generation processing for generating connection information for specifying connection between the axon of the one soma and the dendrite of the other soma, and accumulating the information in the connection information storage unit.

With this configuration, it is possible to realize an information processing apparatus for more specifically simulating growth of somas and the like in the brain.

Furthermore, a fifteenth aspect of the present invention is directed to the information processing apparatus according to the fourteenth aspect, wherein the soma-related information has a soma group identifier for identifying a soma group, which is a group to which a soma belongs, the information processing apparatus further includes a soma group information storage unit in which two or more pieces of soma group information, each having a soma group identifier for identifying a soma group and goal information for specifying a destination to which an axon or a dendrite connected to a soma belonging to the soma group extends, are stored, and the growth unit changes the axon positional information or the dendrite positional information such that an axon or a dendrite extends to a destination specified with the goal information contained in the soma group information of a soma group to which a soma connected to the axon or the dendrite belongs.

With this configuration, it is possible to realize an information processing apparatus for simulating growth of axons or dendrites in the brain.

Furthermore, a sixteenth aspect of the present invention is directed to the information processing apparatus according to the thirteenth aspect, wherein the glial cell information has glial cell positional information for specifying a position of a glial cell, and the growth unit changes the axon positional information of an axon identified with a connection information identifier contained in the glial cell information, such that the position becomes closer to a position indicated by the glial cell positional information contained in the glial cell information.

With this configuration, it is possible to realize an information processing apparatus for simulating growth of axons in the brain.

Furthermore, a seventeenth aspect of the present invention is directed to the information processing apparatus according to any one of the first to thirteenth aspects, further including: an apoptosis processing unit that deletes soma-related information from the soma-related information storage unit according to a predetermined condition.

With this configuration, it is possible to realize an information processing apparatus for simulating processing in the brain in which the number of somas in the brain automatically decreases.

Furthermore, an eighteenth aspect of the present invention is directed to the information processing apparatus according to the seventeenth aspect, wherein, in a case in which the amount of soma-related information stored in the soma-related information storage unit is large enough to satisfy a predetermined condition, the apoptosis processing unit deletes the soma-related information from the soma-related information storage unit.

With this configuration, it is possible to realize an information processing apparatus for simulating apoptosis in the brain.

Furthermore, a nineteenth aspect of the present invention is directed to the information processing apparatus according to the seventeenth or eighteenth aspect, further including: a firing information storage unit in which one or more pieces of firing information having a soma identifier for identifying a soma that has fired are stored; and a firing information accumulating unit that configures firing information having a soma identifier for identifying a soma judged by the judging unit as a soma that fires, and accumulates the firing information in the firing information storage unit, wherein, using the one or more pieces of firing information in the firing information storage unit, the apoptosis processing unit determines a soma that is not connected to another soma, a dendrite, or an axon, determines a soma connected to an axon that does not reach a predetermined goal, or determines a soma that has fired for the number of times that is small enough to satisfy a predetermined condition, and deletes soma-related information having a soma identifier of the determined soma, from the soma-related information storage unit.

With this configuration, it is possible to realize an information processing apparatus for simulating apoptosis in the brain.

Advantageous Effects of Invention

With the information processing apparatus according to the present invention, it is possible to realize an information processing apparatus for simulating processing in the brain.

DESCRIPTION OF EMBODIMENT

Figure 1:
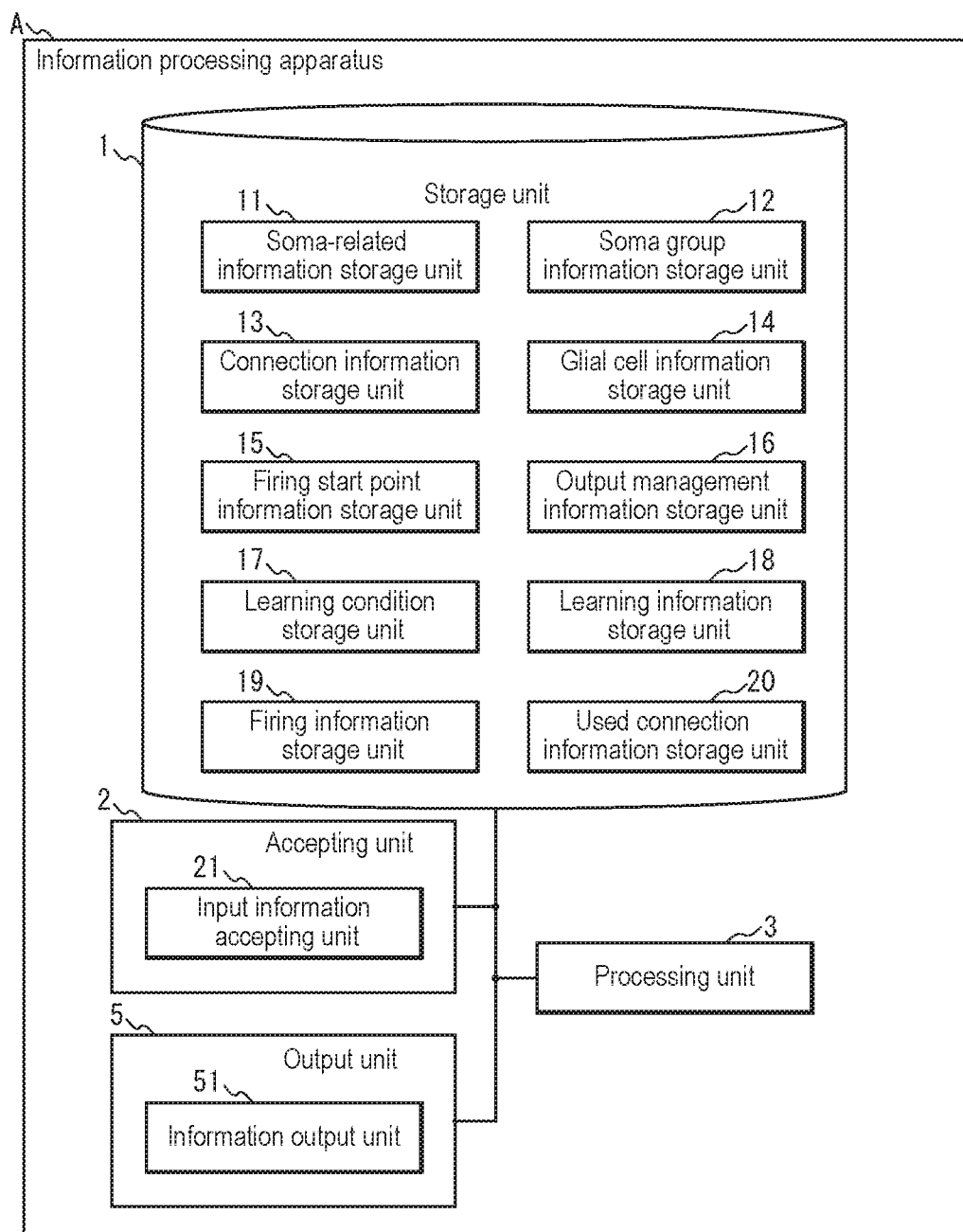
FIG. 1 is a block diagram of an information processing apparatus A in Embodiment 1.

Hereinafter, an embodiment of an information processing apparatus and the like will be described with reference to the drawings. It should be noted that constituent elements denoted by the same reference numerals in the embodiments perform similar operations, and thus a description thereof may not be repeated.

Embodiment 1

In this embodiment, an information processing apparatus will be described in which a firing condition of one or more somas (which may be referred to as nerve cell bodies) is stored, and the information processing apparatus judges whether or not each soma fires, using one or more pieces of information obtained from input, acquires a firing pattern from a judgment result, and determines and outputs output information using the firing pattern.

Furthermore, in this embodiment, an information processing apparatus will be described in which feature information transfer processing is performed using firing start point information for managing information indicating a soma that fires first, according to feature information.

Furthermore, in this embodiment, an information processing apparatus will be described in which calculation processing on two or more pieces of feature information transferred via two or more links to a soma is performed in the soma.

Furthermore, in this embodiment, an information processing apparatus will be described in which there are two or more soma groups (which may be referred to as nerve cell body groups), and information is delivered between soma groups that are connected to each other.

Furthermore, in this embodiment, an information processing apparatus will be described in which information delivery is performed such that information is delivered or is not delivered via a link having an axon (which may be referred to a nerve fiber) and a dendrite (which may be referred to a branched extension).

Furthermore, in this embodiment, an information processing apparatus will be described in which information transfer is performed also considering synapses and spines.

Furthermore, in this embodiment, an information processing apparatus will be described in which an element that has operated does not operate as long as the length of time that has elapsed is not long enough to satisfy a predetermined condition. The element is, for example, soma, an axon, or a dendrite.

Furthermore, in this embodiment, an information processing apparatus will be described in which a firing probability of a soma that has fired is increased.

Furthermore, in this embodiment, an information processing apparatus will be described in which different pieces of output information are output depending on a firing pattern and one or more pieces of external information. The external information is, for example, weather, temperature, scenery in the outside world, odor, a sound, light, or the like.

Furthermore, in this embodiment, an information processing apparatus will be described that has a learning function.

Furthermore, in this embodiment, an information processing apparatus will be described in which an element automatically grows. A trigger for the growth is firing, accepting information, or the like.

Furthermore, in this embodiment, an information processing apparatus will be described that has glial information, wherein the glial cell information affects growth.

Furthermore, in this embodiment, an information processing apparatus will be described in which elements have positional information, and growth and connection of the elements are realized using the positional information.

Furthermore, in this embodiment, an information processing apparatus will be described that simulates how an axon and the like actually grow.

Moreover, in this embodiment, an information processing apparatus will be described that simulates apoptosis processing of cells such as somas. In this example, for example, if the number of somas is large enough to satisfy a predetermined condition, somas are deleted, somas that fire for the number of times that is small enough to satisfy a predetermined condition are deleted, somas that are not connected to a dendrite or an axon are deleted, or somas that are connected to an axon that does not reach a predetermined goal are deleted.

Figure 2:
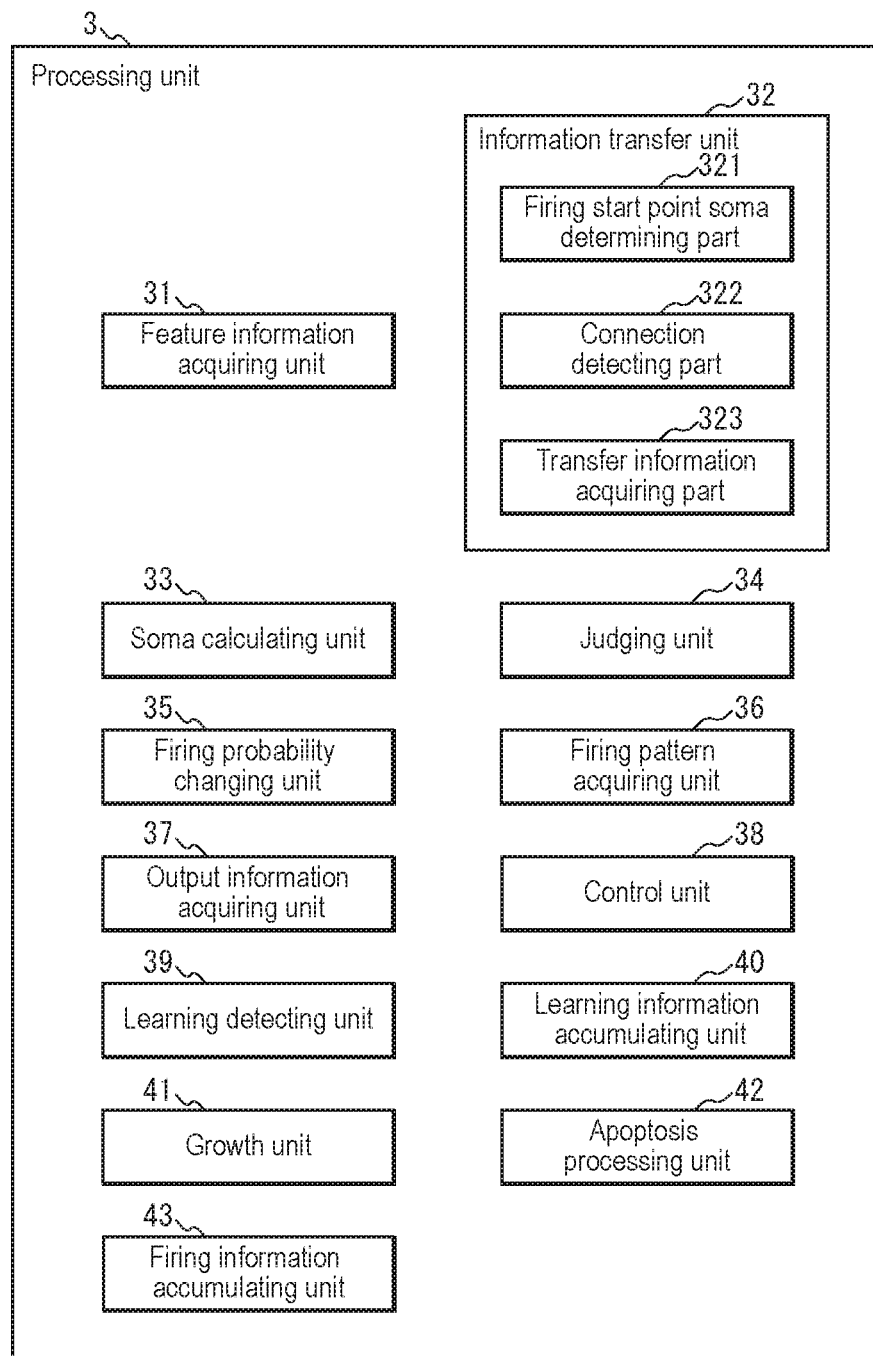
FIG. 2 is a block diagram of a processing unit 3 constituting the information processing apparatus A in the embodiment.

FIG. 1 is a block diagram of an information processing apparatus A in this embodiment. The information processing apparatus A includes a storage unit 1, an accepting unit 2, a processing unit 3, and an output unit 5. FIG. 2 is a block diagram of the processing unit 3 constituting the information processing apparatus A.

The storage unit 1 includes a soma-related information storage unit 11, a soma group information storage unit 12, a connection information storage unit 13, a glial cell information storage unit 14, a firing start point information storage unit 15, an output management information storage unit 16, a learning condition storage unit 17, a learning information storage unit 18, a firing information storage unit 19, and a used connection information storage unit 20.

The accepting unit 2 includes an input information accepting unit 21.

The processing unit 3 includes a feature information acquiring unit 31, an information transfer unit 32, a soma calculating unit 33, a judging unit 34, a firing probability changing unit 35, a firing pattern acquiring unit 36, an output information acquiring unit 37, a control unit 38, a learning detecting unit 39, a learning information accumulating unit 40, a growth unit 41, an apoptosis processing unit 42, and a firing information accumulating unit 43.

The information transfer unit 32 includes a firing start point soma determining part 321, a connection detecting part 322, and a transfer information acquiring part 323.

The output unit 5 includes an information output unit 51.

In the storage unit 1, various types of information are stored. The various types of information are, for example, later-described soma-related information, later-described soma group information, later-described connection information, later-described glial cell information, later-described firing start point information, later-described output management information, a later-described learning condition, later-described learning information, later-described firing information, and later-described used connection information.

In the soma-related information storage unit 11, two or more pieces of soma-related information are stored.

The soma-related information is information related to a soma. The soma-related information has a soma identifier and firing condition information. The soma-related information typically has one or more pieces of dendrite information and one or more pieces of axon information. The dendrite information is information related to a dendrite that realizes information input to a soma. The dendrite information has a dendrite identifier. The dendrite identifier is information for identifying a dendrite, and is, for example, an ID, a name, or the like. The dendrite information preferably has dendrite positional information. The axon information is information related to an axon that realizes information output from a soma. The axon information has an axon identifier. The axon identifier is information for identifying an axon, and is, for example, ID, a name or the like. The axon information preferably has axon positional information. The soma-related information may have goal information. The goal information is information for specifying a goal. The goal is a destination to which an axon or a dendrite connected to a soma extends. The goal information is information indicating a position. The goal information is, for example, positional information. The goal information is, for example, three-dimensional coordinates (x, y, z), two-dimensional coordinates (x, y), or four-dimensional quaternions (x, y, x, w).

Note that, when connection between somas is represented by information of one link, the soma-related information may not have the dendrite information or the axon information.

Furthermore, the soma-related information may have a synapse identifier for identifying a synapse or a spine identifier for identifying a spine, in association with the axon information or the dendrite information. The synapse identifier is typically in association with the axon information. Also, the spine identifier is typically in association with the dendrite information.

Furthermore, the soma-related information may have a soma group identifier for identifying a soma group, which is a group to which a soma belongs. The soma-related information may be in association with the soma group identifier.

Furthermore, the soma-related information preferably has soma positional information indicating a position of a soma. The soma positional information is, for example, three-dimensional coordinates (x, y, z), two-dimensional coordinates (x, y), or four-dimensional quaternions (x, y, x, w).

Furthermore, the dendrite positional information is information for specifying a position of a dendrite, and is, for example, one or at least two sets of three-dimensional coordinates (x, y, z), or one or at least two sets of two-dimensional coordinates (x, y). If the dendrite positional information has two or more sets of coordinates, the dendrite is a line obtained by linking points represented by the two or more sets of coordinates.

Furthermore, the axon positional information is information for specifying a position of an axon, and is, for example, one or at least two sets of three-dimensional coordinates (x, y, z), or one or at least two sets of two-dimensional coordinates (x, y). If the axon positional information has two or more sets of coordinates, the axon is a line obtained by linking points represented by the two or more sets of coordinates.

Note that a dendrite and an axon may be branched. If a dendrite and an axon are branched, the positional information thereof can be represented by three or at least four set of coordinates. There is no limitation on the method for representing the dendrite positional information and the axon positional information.

Furthermore, the soma identifier is information for identifying a soma. The soma identifier is, for example, an ID, a name, or the like. The firing condition information is information related to a condition for the soma to fire. The firing condition information typically has one or more pieces of feature information. The feature information may be information having an information identifier for identifying information and an information amount indicating a magnitude of information, or may be information only having an information amount indicating a magnitude of information. The information amount is, for example, a numeric value greater than 0. The firing condition information is, for example, "feature information≥0.5", "feature information>0.7", "information amount≥0.5", "information amount>0.7" "(information identifier=A & information amount≥0.5) & (information identifier=B & information amount>0.8)", or the like. The feature information constituting the firing condition information is an information amount. The feature information is, for example, a feature amount, but also may be input information itself. The feature amount is, for example, a feature amount of an image obtained as a result of image analysis, or a feature amount of a speech obtained as a result of speech analysis. The firing condition information preferably has firing probability information. The firing probability information is information related to a probability of firing. The firing probability information may be a firing probability itself, or may be a value or the like obtained by converting the firing probability through a function or the like. It is preferable that the firing probability information is referred to, and, depending on the probability indicated by the firing probability information, a soma may fire or may not fire even at the same feature information.

Two or more pieces of soma-related information may be grouped. The term "grouped" is, for example, a state in which a soma group identifier is associated with pieces of soma-related information. The state of being associated is a concept that they can be associated with each other. The soma group identifier is information for identifying a soma group, which is a group to which a soma belongs. The term "grouped" is a state in which, for example, pieces of soma-related information have the same goal information. The term "grouped" is, for example, a state of having the same soma group identifier, or is, for example, a state in which pieces of soma-related information in a group are connected to each other via a link. It will be appreciated that there is no limitation on the method for grouping soma-related information and the data structure. The soma-related information may have a soma group identifier.

Furthermore, the soma-related information preferably has held energy amount information indicating the amount of energy held by a soma. The soma-related information preferably has necessary energy amount information indicating the amount of energy necessary for firing. The dendrite information preferably has held energy amount information indicating the amount of energy held by a dendrite. The dendrite information preferably has necessary energy amount information indicating the amount of energy necessary to perform information transfer using a dendrite. The axon information preferably has held energy amount information indicating the amount of energy held by an axon. The axon information preferably has necessary energy amount information indicating the amount of energy necessary to perform information transfer using an axon.

In the soma group information storage unit 12, two or more pieces of soma group information are stored. The soma group information has a soma group identifier and goal information. The goal information is information for specifying a destination to which an axon or a dendrite connected to a soma belonging to a soma group extends. The goal information is, for example, one or at least two sets of three-dimensional coordinates (x, y, z), or one or at least two sets of two-dimensional coordinates (x, y). The goal information may be, for example, information indicating a direction.

In the connection information storage unit 13, one or at least two pieces of connection information are stored. The connection information is information for specifying connection between two or more somas. The connection information may be information for specifying connection between an axon of one soma and a dendrite of another soma. This information is also information for specifying connection between somas. The connection information may be information for specifying connection between one synapse and one spine. This information is also information for specifying connection between somas. The connection information has, for example, two soma identifiers of somas that are connected to each other. The connection information has, for example, an axon identifier of an axon, and a dendrite identifier of a dendrite that is connected to the axon. The connection information has, for example, a synapse identifier of a synapse, and a spine identifier of a spine that can perform information transfer with the synapse. The connection information may have information transfer probability information. The information transfer probability information is information related to a probability at which information transfer between one soma and another soma is performed. The information transfer probability information may be information related to a probability at which information transfer between an axon and a dendrite is performed. Also in this case, the information transfer probability information is information related to a probability at which information transfer between one soma and another soma is performed. The information transfer probability information may be information related to a probability at which information transfer between a synapse and a spine is performed. Also in this case, the information transfer probability information is information related to a probability at which information transfer between one soma and another soma is performed. In this example, the connection direction between somas is typically one direction.

The connection information may be information indicating connection between a soma and an axon. In this case, the connection information has a soma identifier and an axon identifier. The connection information may be information indicating connection between a soma and a dendrite. In this case, the connection information has a soma identifier and a dendrite identifier.

The connection information may be information for specifying connection between a glial cell and an axon or a dendrite. In this case, the connection information has, for example, a glial cell identifier for identifying glial cell information and an axon identifier. The connection information may have, for example, a glial cell identifier and a dendrite identifier.

In the glial cell information storage unit 14, one or at least two pieces of glial cell information are stored. The glial cell information is information related to a glial cell. The glial cell information preferably has a glial cell identifier for identifying a glial cell. The glial cell information has, for example, a soma identifier for identifying a soma that supports connection, or a connection information identifier for identifying connection information that supports connection. The glial cell information has, for example, an axon identifier of an axon whose connection is supported by the glial cell, or a dendrite identifier of a dendrite whose connection is supported by the glial cell. The glial cell information preferably has a glial cell type identifier for identifying the type of glial cell. The type of glial cell is, for example, an oligodendrocyte (hereinafter, referred to as "oligo" as appropriate), or an astrocyte. An oligo is a cell that can be connected to an axon. An astrocyte is a cell that can be connected to a soma or a dendrite. The glial cell information preferably has glial cell positional information for specifying a position of a glial cell. In particular, the glial cell information of an oligo preferably has the glial cell positional information. The glial cell information may have projection length information indicating a length of each of one or more projections. The glial cell information may have projection number information indicating the number of projections projecting from a glial cell. Typically it is preferable that, when the length of the entire glial cell calculated from the projection length information of each projection reaches a threshold value, the glial cell does not grow any more.

In the firing start point information storage unit 15, one or more pieces of firing start point information are stored. The firing start point information has an information identifier for identifying feature information, and one or more soma identifiers each for identifying a soma that fires when the feature information is accepted. The information identifier is, for example, information for specifying the type of feature amount of an image, and is, for example, red "R" composing a color, green "G" composing a color, and blue "B" composing a color. The information identifier is, for example, information for specifying the type of feature amount of a sound, and is, for example, "frequency", "amplitude", or the like.

In the output management information storage unit 16, one or at least two pieces of output management information are stored. The output management information is information having an output condition and output information. The output management information may be information of a pair of an output condition and output information.

The output condition is a condition that is used to determine output information. The output condition is a condition for output using the firing pattern. The output condition may be a firing pattern itself or may be information having a firing pattern and output probability information. The output probability information is information related to a probability for acquiring output information. The output condition may be a firing pattern, and information of the lower limit of the number of soma identifiers contained in the firing pattern that is applied, or may be a firing pattern, and information of the lower limit of the proportion of soma identifiers contained in the firing pattern that is applied, for example. The firing pattern has one or more soma identifiers. The firing pattern is a pattern of firing of one or at least two somas. The output information is information corresponding to the firing pattern. The output information is, for example, emotion information related to emotion of a person, intention information indicating intention of a person, behavior information related to body movements of a person, or the like. The emotion information is, for example, joy, sadness, a frightened feeling, a surprised feeling, or the like. The emotion information is, for example, an ID for identifying emotion. The intention information is, for example, information for identifying intention. The behavior information is, for example, information that is reflected in a behavior of an avatar (character). The technique for moving an avatar is a known technique, and thus a detailed description thereof has been omitted.

The output condition may be a condition using information related to a firing pattern and one or more pieces of external information. The external information is information of external conditions. The external information may be referred to as a user context. The external information is, for example, temperature, weather, an odor, a sound, light, or the like. The external information is typically information that is accepted when input information is accepted, and that is other than the input information.

In the learning condition storage unit 17, one or at least two learning conditions are stored. Each learning condition is a condition for performing learning. The learning condition is a condition using the firing pattern. The learning condition may be a firing pattern itself. The learning condition may be, for example, a firing pattern having one or more soma identifiers, and the number of somas that have to fire in order to perform learning or the proportion of somas that have to fire in order to perform learning (the number of somas that fire among the soma identifiers contained in the firing pattern contained in the learning condition/the number of soma identifiers contained in the firing pattern contained in the learning condition), or the like. The learning condition may have a firing pattern and learning probability information. The learning probability information is information related to a probability at which it is determined to perform learning. If the learning condition has learning probability information, there is the case in which it is probabilistically judged "not to perform learning" using the learning probability information even in the case in which it can be judged "to perform learning" using the firing pattern.

In the learning information storage unit 18, one or at least two pieces of learning information are stored. The learning information is information obtained through learning. The learning information is information that is used after learning. The learning information has input information or one or more pieces of feature information acquired from the input information, and a firing pattern. In this example, the feature information may be an information identifier for identifying feature information. In this example, the feature information may be an information identifier and an information amount. The learning information may have holding time information indicating a holding time of a firing pattern. The holding time is a period of time if for which the firing pattern is not used, the firing pattern is deleted. The processing for deleting learning information if the learning information is not used for the time indicated by the holding time information is performed, for example, by the processing unit 3.

In the firing information storage unit 19, one or at least two pieces of firing information are stored. In this example, the firing information is information related to a result of firing. The firing information has a soma identifier for identifying a soma that has fired. The firing information may typically have timer information indicating the time at which firing occurred. The timer information may be information indicating a relative time, or may be information indicating an absolute time. The firing information in the firing information storage unit 19 may be automatically deleted by the processing unit 3 after the elapse of a predetermined period of time after the firing information was accumulated.

In the used connection information storage unit 20, one or at least two pieces of used connection information are stored. The used connection information is information indicating a history in which connection information was used for information transfer. The used connection information may be information indicating a history in which an axon or a dendrite was used for information transfer. The used connection information has, for example, a connection information identifier. The used connection information has, for example, an axon identifier and/or a dendrite identifier. The used connection information has, for example, a synapse identifier and/or a spine identifier. The used connection information may have, for example, timer information indicating the time at which connection information was used.

The accepting unit 2 accepts various types of information. The various types of information are, for example, later-described input information, external information, or the like. The various types of information may be input by any part such as a camera, a microphone, a numeric keypad, a keyboard, a mouse, a menu screen, or various types of sensors such as a motion sensor or a temperature sensor. The accepting unit 2 may be realized by a device driver for an input part such as a camera, a microphone, a numeric keypad, or a keyboard, control software for a menu screen, or the like. The accepting is a concept that encompasses accepting information input from an input device such as a camera, a microphone, a keyboard, a mouse, or a touch panel, receiving information transmitted via a wired or wireless communication line, and accepting information read from a storage medium such as an optical disk, a magnetic disk, a semiconductor memory, or the like.

The input information accepting unit 21 accepts input information. The input information is information that is input. The input information is, for example, a moving image, a still image, a speech, a character string, or the like. There is no limitation on the data type, data structure, and the like of the input information. It is preferable that the input information accepting unit 21 also accepts one or more pieces of external information.

The processing unit 3 performs various types of processing. The various types of processing are, for example, processes that are performed by the feature information acquiring unit 31, the information transfer unit 32, the soma calculating unit 33, the judging unit 34, the firing probability changing unit 35, the firing pattern acquiring unit 36, the output information acquiring unit 37, the control unit 38, the learning detecting unit 39, the learning information accumulating unit 40, the growth unit 41, the apoptosis processing unit 42, the firing information accumulating unit 43, and the like.

The feature information acquiring unit 31 acquires one or more pieces of feature information from the input information. The feature information is, for example, a feature amount, input information itself, or the like. The feature information has, for example, an information identifier and an information amount.

For example, the feature information acquiring unit 31 performs image analysis on input information, which is an accepted image, thereby acquiring a pair of one or more pieces of information identifier and an information amount of the image. For example, the feature information acquiring unit 31 performs image analysis on input information, which is an accepted image, thereby acquiring three pairs of information consisting of "information identifier "R" (indicating red) and information amount=521", "information identifier "G" (indicating green) and information amount=219", and "information identifier "B" (indicating blue) and information amount=56". This information is information indicating values of R, G, and B.

For example, the feature information acquiring unit 31 analyzes input information, which is an accepted speech, thereby acquiring one or more pieces of feature information of the speech. For example, the feature information acquiring unit 31 analyzes input information, which is an accepted speech, thereby acquiring "information identifier (frequency=X) and information amount=50", "information identifier (frequency=Y) and information amount=120", and the like. This information is information indicating levels at the respective frequencies.

Note that the processing for acquiring a feature amount of an image and the processing for acquiring a feature amount of a speech are known techniques, and thus a detailed description thereof has been omitted.

The information transfer unit 32 acquires the one or more pieces of feature information acquired by the feature information acquiring unit 31 and one or more soma identifiers each for identifying a soma that fires first. The information transfer unit 32 acquires, from the firing start point information storage unit 15, one or more soma identifiers that are each paired with an information identifier contained in the feature information acquired by the feature information acquiring unit 31, and acquires, as a pair, each of the one or more soma identifiers and an information amount contained in the feature information acquired by the feature information acquiring unit 31. Typically an information amount is given to each of the somas identified with the one or more soma identifiers. The somas identified with the one or more soma identifiers may be an identifier of a soma that fires first.

The information transfer unit 32 acquires one or more pieces of feature information given from one or more other somas or one or more pieces of feature information acquired from the one or more pieces of feature information, and a soma identifier of each of one or more somas that are to be subjected to judgment of firing.

The information transfer unit 32 acquires one or more pieces of feature information applied to the soma-related information of a soma judged by the judging unit 34 as a soma that fires or one or more pieces of feature information acquired from the one or more pieces of feature information, and a soma identifier of each of the one or more somas connected to the soma judged by the judging unit 34 as a soma that fires. The information transfer unit 32 acquires a soma identifier of each of the one or more somas connected to the soma judged by the judging unit 34 as a soma that fires, using the connection information in the connection information storage unit 13.

The information transfer unit 32 acquires one piece of feature information acquired by a later-described soma calculating unit 33, and a soma identifier of each of one or more somas that are to be subjected to judgment of firing. In this example, the one piece of feature information is typically one information amount.

There is the case in which, using the connection information for specifying connection between a soma group containing a soma judged by the judging unit 34 as a soma that fires (referred to as a first soma group) and another soma group (referred to as a second soma group), the information transfer unit 32 acquires soma identifiers of one or more somas contained in the second soma group. The soma identifiers of one or more somas contained in the second soma group are identifiers of somas that are positioned close to the first soma group.

The information transfer unit 32 probabilistically acquires a soma identifier of each of the one or more somas connected to the soma judged by the judging unit 34 as a soma that fires, using the information transfer probability information contained in the connection information in the connection information storage unit 13. The probabilistically acquiring is either judging that a soma fires or judging that the soma does not fire, depending on information of probability (information transfer probability information, in this example). The processing for the probabilistically acquiring is a known technique, and thus a detailed description thereof has been omitted.

Note that, it is preferable that, for example, based on used connection information indicating a history in which, an axon, a dendrite, a synapse, or a spine was used, the information transfer unit 32 performs information transfer to a next soma only if the later-described judging unit 34 judges that at least a predetermined period of time has elapsed after the axon, the dendrite, the synapse, or the spine was recently used, or judges that they have not been used for a period of time greater than the predetermined period of time.

Furthermore, in the case of performing information transfer to a next soma, the information transfer unit 32 preferably configures used connection information, and accumulates it in the used connection information storage unit 20. That is to say, in the case of performing information transfer to a next soma, the information transfer unit 32 acquires timer information indicating the current time from an unshown timer. The information transfer unit 32 acquires one or more of the axon identifier of the used axon, the dendrite identifier of the used dendrite, the synapse identifier of the used synapse, or the spine identifier of the used spine. The information transfer unit 32 configures used connection information having the timer information and the acquired one or more identifiers, and accumulates it in the used connection information storage unit 20. Alternatively for example, the information transfer unit 32 acquires a connection information identifier of connection (link) used for the information transfer, acquires timer information indicating the current time from an unshown timer, configures used connection information having the connection information identifier and the timer information, and accumulates it in the used connection information storage unit 20.

Furthermore, it is preferable that, in the case of performing information transfer to a next soma, the information transfer unit 32 reduces the energy amount indicated by the held energy amount information that is paired with the axon identifier of the axon used for the transfer and the held energy amount information that is paired with the dendrite identifier of the dendrite used for the transfer. It is assumed that the function for reducing the energy amount is stored, for example, in the storage unit 1. There is no limitation on the function. The function is, for example, Numerical Formula 1 below.

$$f(t) = u(t)Vs(1 - e^{-(t/\tau)}) + u(t)E(e^{-(t/\tau)})$$

$$u(t) = \begin{cases} = 0 & t \leq 0 \\ = 1 & t > 0 \end{cases}$$

$$Vs = E + \frac{1}{g}I, \tau = c/g$$

Numerical Formula 1

In Numerical Formula 1, E, g, and c are parameters, and I is an input signal (request signal). In Numerical Formula 1, for example, E=−65 MV, g=0.025 μS, and C=0.5 nF.

The firing start point soma determining part 321 acquires one or more soma identifiers that are respectively paired with information identifiers for identifying the one or more pieces of feature information acquired by the feature information acquiring unit 31, from the firing start point information storage unit 15. The information identifiers may be contained in the feature information acquired by the feature information acquiring unit 31, or may be associated with the feature information or the information amount acquired by the feature information acquiring unit 31.

The connection detecting part 322 detects one or more somas connected to a soma judged by the judging unit 34 as a soma that fires, using the connection information in the connection information storage unit 13. The detecting a soma is typically acquiring a soma identifier.

For example, the connection detecting part 322 acquires a soma identifier of a soma judged by the judging unit 34 as a soma that fires, and acquires one or more soma identifiers that are each paired with the soma identifier, from the connection information storage unit 13.

For example, the connection detecting part 322 acquires a soma identifier of a soma judged by the judging unit 34 as a soma that fires, acquires an axon identifier that is paired with the soma identifier, from the soma-related information storage unit 11, acquires a dendrite identifier that is paired with the axon identifier, from the connection information storage unit 13, and acquires a soma identifier that is paired with the dendrite identifier, from the soma-related information storage unit 11.

For example, the connection detecting part 322 acquires a soma identifier of a soma judged by the judging unit 34 as a soma that fires, acquires a synapse identifier that is paired with the soma identifier, from the soma-related information storage unit 11, acquires a spine identifier that is paired with the synapse identifier, from the connection information storage unit 13, and acquires a soma identifier that is paired with the spine identifier, from the soma-related information storage unit 11.

For example, the connection detecting part 322 acquires a soma group identifier of a soma group to which a soma judged by the judging unit 34 as a soma that fires belongs. If the soma judged by the judging unit 34 as a soma that fires is a soma at an end in the soma group (does not have any other soma to which the soma transfers the feature information, in the same soma group), the connection detecting part 322 acquires a soma group identifier of another soma group that is paired with the soma group identifier for identifying the soma group, from the connection information storage unit 13. Next, for example, the connection detecting part 322 acquires one or more soma identifiers for identifying one or more somas at an end in the soma group specified with the acquired soma group identifier (somas that do not receive feature information from another soma in the same soma group).

For example, if the soma identifier of the soma judged by the judging unit 34 as a soma that fires is stored in the storage unit 1 as the last soma of the information transfer in the soma group to which the soma belongs, the connection detecting part 322 acquires a soma group identifier of another soma group that is paired with the soma group identifier for identifying the soma group, from the connection information storage unit 13. For example, if a soma is stored in the storage unit 1 as a soma that first receives information transfer from another soma group, among somas with one or more soma identifiers that are each paired with the acquired soma group identifier of the other soma group, the connection detecting part 322 acquires a soma identifier of the soma from the storage unit 1.

The transfer information acquiring part 323 acquires information that is used for information transfer between somas. The transfer information acquiring part 323 acquires feature information that is transferred and a soma identifier of a soma that is a transfer destination. The transfer information acquiring part 323 acquires, for example, one or more pieces of feature information applied to the soma-related information of a soma judged by the judging unit 34 as a soma that fires or one or more pieces of feature information acquired from the one or more pieces of feature information, and soma identifiers of one or more somas detected by the connection detecting part 322.

The soma calculating unit 33 performs calculation on two or more pieces of feature information given from two or more other somas, thereby acquiring one piece of feature information. In this example, the feature information is typically an information amount, That is to say the soma calculating unit 33 typically performs calculation on two or more information amounts given from two or more other somas, thereby acquiring one information amount. The calculation is predetermined calculation. The calculation is, for example, a process that adds two or more information amounts given from two or more other somas. The calculation is, for example, a process that adds two or more information amounts given from two or more other somas, and then multiplies the obtained result by a constant that is less than 1.

Using the one or more pieces of feature information acquired by the information transfer unit 32, and firing condition information that is paired with the one or more soma identifiers acquired by the information transfer unit 32, the judging unit 34 judges whether or not the soma identified with each of the soma identifiers fires. The one or more pieces of feature information are, for example, information amounts.

The judging unit 34 acquires, for example, firing condition information that is paired with each of the one or more soma identifiers acquired by the information transfer unit 32, from the soma-related information storage unit 11. The judging unit 34 judges, for example, whether or not the information amount acquired by the information transfer unit 32 matches the condition indicated by the acquired firing condition information.

It is preferable that the judging unit 34 does not judge that a soma, judged as a soma that has fired, fires, as long as the length of time that has elapsed is not long enough to satisfy a predetermined condition. The not judging that a soma fires may be judging that a soma does not fire.

The judging unit 34 acquires recent timer information, the timer information being paired with a soma identifier of a soma that is to be subjected to judgment, for example, referring to the firing information storage unit 19. The judging unit 34 acquires current timer information, for example, from an unshown timer. The judging unit 34 acquires information of the time elapsed after the recent firing, for example, from the current timer information and the recent timer information. Next, it is preferable that the judging unit 34 judges whether or not the elapsed time is less than a threshold value or is less than or equal to a threshold value, and, if it is judged that the elapsed time is less than a threshold value or is less than or equal to a threshold value, the judging unit 34 judges that the soma does not fire.

If the firing condition information has firing probability information indicating a firing probability the judging unit 34 judges whether or not a soma fires, using the firing probability information, and thus the judging unit 34 either judges that a soma fires or judges that the soma does not fire, in the case of judging whether or not the soma fires even using the same one or more pieces of feature information and the same firing condition information. That is to say it is preferable that, even in the case in which the same one or more pieces of feature information are given to one soma, the judging unit 34 either judges that the soma fires or judges that the soma does not fire, depending on the firing probability information corresponding to the soma.

Furthermore, it is preferable that, even in the case in which the same one or more pieces of feature information are input, the judging unit 34 either judges that a soma fires or judges that the soma does not fire, depending on external information.

The judging unit 34 accumulates, for example, a soma identifier of a soma that has fired and timer information indicating the time at which firing occurred, as a pair, in the storage unit 1. That is to say, if it is judged that a soma has fired, the judging unit 34 acquires timer information from an unshown timer. Then, the judging unit 34 accumulates firing information having a soma identifier of the soma that has fired and the timer information, in the firing information storage unit 19.

It is also preferable that, if an operation regarding the connection information has been performed once, the operation is not performed as long as the length of time that has elapsed is not long enough to satisfy a predetermined condition. That is to say it is preferable that the judging unit 34 acquires timer information indicating the time at which an axon, a dendrite, a synapse, or a spine that is used for information transfer was recently used, from the used connection information storage unit 20, compares it with the tinier information indicating the current time, and judges not to perform information transfer using the axon, the dendrite, the synapse, or the spine as long as the length of time that has elapsed is not long enough to satisfy a predetermined condition, Furthermore, it is preferable that, if it is judged that one soma fires, the judging unit 34 reduces the energy amount indicated by the held energy amount information contained in the soma-related information of the soma. It is assumed that the function for reducing the energy amount is stored, for example, in the storage unit 1. There is no limitation on the function. The function is, for example, Numerical Formula 2 below.

$$f(t) = \frac{\sin^2 Nt}{\sin^2 t} (N = 1, 2, 3, \cdots)$$ Numerical Formula 2

In Numerical Formula 2, t is the time, and f(t) is the amount of energy held.

The firing probability changing unit 35 changes the firing probability information corresponding to a soma judged by the judging unit 34 as a soma that fires, so as to increase the firing probability. That is to say, the firing probability changing unit 35 acquires a soma identifier of a soma judged by the judging unit 34 as a soma that fires, and changes the firing probability information that is paired with the soma identifier, so as to increase the firing probability. There is no limitation on the algorithm for changing the firing probability information. The firing probability changing unit 35 may add a predetermined value to the firing probability information, may add a predetermined proportion of value to the firing probability information, or may acquire an increasing probability based on accepted one or more pieces of feature information, for example. That is to say the degree of increase in the probability may be constant, or may be dynamically changed.

The firing pattern acquiring unit 36 acquires a firing pattern containing one or more soma identifiers each for identifying a soma judged by the judging unit 34 as a soma that has fired.

It is preferable that the firing pattern acquiring unit 36 applies the input information accepted by the input information accepting unit 21 or one or more pieces of feature information acquired from the input information to one or more pieces of learning information in the learning information storage unit 18, thereby acquiring a firing pattern corresponding to the input information or the one or more pieces of feature information acquired from the input information. In this example, the firing pattern is a firing pattern acquired using the learning information.

There is no limitation on the time at which the firing pattern acquiring unit 36 acquires a firing pattern. The firing pattern acquiring unit 36 may regularly acquire a firing pattern, may irregularly acquire a firing pattern, or may acquire a firing pattern each time the judging unit 34 detects firing of a soma.

Furthermore, there is no limitation on the temporal interval of the firing pattern that is acquired by the firing pattern acquiring unit 36. The firing pattern acquiring unit 36 may acquire one or more soma identifiers that are each paired with timer information indicating the time that is within a threshold value from the current time or is more recent than a threshold value, from the firing information storage unit 19. The firing pattern acquiring unit 36 may acquire one or more soma identifiers contained in all pieces of firing information in the firing information storage unit 19, from the firing information storage unit 19. It is preferable that the temporal interval of the firing pattern that is acquired by the firing pattern acquiring unit 36 dynamically changes.

The output information acquiring unit 37 acquires output information corresponding to the firing pattern acquired by the firing pattern acquiring unit 36, from the output management information storage unit 16.

The output information corresponding to the firing pattern is typically output information that is paired with a firing pattern that is similar, enough to satisfy a predetermined condition, to the firing pattern acquired by the firing pattern acquiring unit 36. The case in which a firing pattern A and a firing pattern B are similar enough to satisfy a predetermined condition is, for example, a case in which soma identifiers in a number that is greater than or equal to a threshold value or is greater than a threshold value, among the one or more soma identifiers contained in the firing pattern A, are contained in the firing pattern B. The case in which the firing pattern A and the firing pattern B are similar enough to satisfy a predetermined condition is, for example, a case in which soma identifiers in a number that is greater than or equal to a threshold value or is greater than a threshold value, among the one or more soma identifiers contained in the firing pattern B, are contained in the firing pattern A. The case in which the firing pattern A and the firing pattern B are similar enough to satisfy a predetermined condition is, for example, a case in which soma identifiers at a proportion that is greater than or equal to a threshold value or is greater than a threshold value, among the one or more soma identifiers contained in the firing pattern A, are contained in the firing pattern B. The case in which the firing pattern A and the firing pattern B are similar enough to satisfy a predetermined condition is, for example, a case in which soma identifiers at a proportion that is greater than or equal to a threshold value or is greater than a threshold value, among the one or more soma identifiers contained in the firing pattern B, are contained in the firing pattern A.

For example, the output information acquiring unit 37 detects a firing pattern that is similar, enough to satisfy a predetermined condition, to the firing pattern acquired by the firing pattern acquiring unit 36, probabilistically judges whether or not the output condition is satisfied, using output probability information that is paired with the firing pattern, and, if it is judged that the output condition is satisfied, acquires output information that is paired with the output condition, from the output management information storage unit 16.

The output information acquiring unit 37 determines an output condition that matches the firing pattern acquired by the firing pattern acquiring unit 36 and the one or more pieces of external information accepted by the input information accepting unit 21, and acquires output information that is paired with the output condition. The output information acquiring unit 37 determines an output condition from among the output conditions stored in the output management information storage unit 16, and acquires output information that is paired with the output condition.

For example, the output information acquiring unit 37 detects a firing pattern that is similar, enough to satisfy a predetermined condition, to the firing pattern acquired by the firing pattern acquiring unit 36, from the output management information storage unit 16, and, if it is judged that one or more pieces of external information that are each paired with the firing pattern is similar, enough to satisfy a predetermined condition, to the one or more pieces of external information accepted by the input information accepting unit 21, acquires output information that is paired with the firing pattern and the one or more pieces of external information in the output management information storage unit 16.

Furthermore, for example, the output information acquiring unit 37 detects a firing pattern that is similar, enough to satisfy a predetermined condition, to the firing pattern acquired by the firing pattern acquiring unit 36, from the output management information storage unit 16, if it is judged that one or more pieces of external information that are each paired with the firing pattern is similar, enough to satisfy a predetermined condition, to the one or more pieces of external information accepted by the input information accepting unit 21, probabilistically judges whether or not the output condition is satisfied, using output probability information that is paired with the firing pattern and the one or more pieces of external information, and, if it is judged that the output condition is satisfied, acquires output information that is paired with the output condition, from the output management information storage unit 16.

The output information acquiring unit 37 cannot always acquire output information.

The control unit 38 performs control such that the processing by the judging unit 34, the processing by the firing pattern acquiring unit 36, and the processing by the information transfer unit 32 are repeated twice or more.

The learning detecting unit 39 detects a learning condition that the firing pattern acquired by the firing pattern acquiring unit 36 matches. In this example, if some of the soma identifiers of the firing pattern acquired by the firing pattern acquiring unit 36 and all or some of the soma identifiers constituting the firing pattern contained in the learning condition are similar enough to satisfy a predetermined condition, the learning detecting unit 39 judges that the firing pattern acquired by the firing pattern acquiring unit 36 matches the learning condition. The detecting a learning condition is, for example, acquiring a learning condition identifier for identifying a learning condition, acquiring information indicating that the firing pattern matches the learning condition, or the like.

If the learning detecting unit 39 detects a matching learning condition, the learning information accumulating unit 40 accumulates the learning information in the learning information storage unit 18. The learning information has input information from which the firing pattern acquired by the firing pattern acquiring unit 36 is obtained or one or more pieces of feature information acquired from the input information, and a firing pattern having at least some soma identifiers constituting the firing pattern acquired by the firing pattern acquiring unit 36. At least some soma identifiers are, for example, one or more soma identifiers obtained by excluding the one or more soma identifiers used to detect the learning condition, from the firing pattern acquired by the firing pattern acquiring unit 36.

The growth unit 41 performs one or more of soma generation processing, connection information generation processing, connection information growth processing, and glial cell generation processing.

The soma generation processing is processing for generating soma-related information having a soma identifier. The soma generation processing is processing, for example, for generating a unique soma identifier, generating soma positional information of a position that satisfies a predetermined condition, from the position indicated by soma positional information contained in soma-related information of a soma from which division occurred, and accumulating soma-related information having the soma identifier and the soma positional information in the soma-related information storage unit 11. It is also possible that part of information constituting generated soma-related information of a soma is NULL (no value).

It is also possible that the soma generation processing is, for example, processing for copying part of information constituting soma-related information of a soma from which division occurred, and generating soma-related information of a divided soma having the information. The information that is copied is, for example, firing condition information. It is preferable that the growth unit 41 sets the soma positional information contained in soma-related information that is generated to be information with a position that does not overlap the positions of other elements. It is preferable that the growth unit 41 sets the soma positional information contained in soma-related information that is generated to be information with a position that is close, enough to satisfy a predetermined condition, to the position indicated by the soma positional information of the soma from which division occurred. In the soma generation processing.

The connection information generation processing is processing for generating connection information, and accumulating the connection information in the connection information storage unit 13. The connection information generation processing is, for example, processing for acquiring soma identifiers of two somas that are connected to each other, generating connection information having the two soma identifiers, and accumulating it in the connection information storage unit 13. The connection information generation processing is, for example, processing for acquiring an axon identifier of an axon and a dendrite identifier of a dendrite that are connected to each other, generating connection information having the two identifiers, and accumulating it in the connection information storage unit 13. The connection information generation processing is, for example, processing for generating a synapse identifier of a synapse from which information transfer is performed and a spine identifier of a spine to which information transfer is performed, generating connection information having the two identifiers, and accumulating it in the connection information storage unit 13.

The connection information growth processing is processing for growing connection information. The connection information growth processing is, for example, changing the position of axon positional information contained in axon information to that in a direction in which the axon extends. The connection information growth processing is, for example, changing the position of dendrite positional information contained in dendrite information to that in a direction in which the dendrite extends.

It is preferable that the growth unit 41 performs soma generation processing for generating soma-related information of a divided soma, which is a new soma obtained by dividing a soma judged by the judging unit 34 as a soma that has fired for the number of times or at the frequency that is large enough to satisfy a predetermined condition, and accumulating it in the soma-related information storage unit 11.

It is preferable that the growth unit 41 performs connection information generation processing for generating connection information for connecting a soma judged by the judging unit 34 as a soma that has fired for the number of times or at the frequency that is large enough to satisfy a predetermined condition and a divided soma, and accumulating it in the connection information storage unit 13. The divided soma is a soma obtained by dividing a soma from which generation of the divided soma occurred.

It is preferable that the growth unit 41 performs soma generation processing for generating soma-related information of a divided soma, which is a new soma obtained by dividing a soma connected to glial cell information that satisfies a predetermined condition, and accumulating it in the soma-related information storage unit 11.

It is preferable that the growth unit 41 performs connection information growth processing for growing an axon or a dendrite connected to glial cell information that satisfies a predetermined condition.

It is preferable that, in the case in which axon positional information of an axon of one soma and dendrite positional information of a dendrite of another soma are close to each other enough to satisfy a predetermined condition, the growth unit 41 performs connection information generation processing for generating connection information having a soma identifier of the one soma and a soma identifier of the other soma, and accumulating it in the connection information storage unit 13.

It is preferable that the growth unit 41 performs the following glial cell generation processing. That is to say, for example, if the amount of energy held by an element that is a soma, an axon, or a dendrite becomes small, enough to satisfy a predetermined condition, with respect to the necessary energy amount, the growth unit 41 generates glial cell information connected to the element. The predetermined condition is, for example, "amount of energy held<necessary energy amount", "amount of energy held≤necessary energy amount", "amount of energy held−necessary energy amount≤threshold value", or "amount of energy held−necessary energy amount<threshold value". More specifically, for example, the growth unit 41 judges whether or not the amount of held energy indicated by the held energy amount information contained in information of each element (soma-related information, axon information, or dendrite information) is small, enough to satisfy a predetermined condition, with respect to the necessary energy amount indicated by the necessary energy amount information contained in the information of the element, and, if it is judged that the amount of held energy is small, generates glial cell information having an identifier for identifying the element (a soma identifier, an axon identifier, or a dendrite identifier), and accumulates it in the glial cell information storage unit 14.

The apoptosis processing unit 42 may delete the soma-related information from the soma-related information storage unit 11. It is preferable that, in the case in which the soma-related information is deleted, the apoptosis processing unit 42 deletes information related to a soma corresponding to the soma-related information, information related to an axon connected to the soma corresponding to the soma-related information, and information related to a dendrite connected to the soma corresponding to the soma-related information. That is to say, it is preferable that the apoptosis processing unit 42 deletes connection information having a soma identifier contained in the deleted soma-related information, connection information having an axon identifier contained in the delete soma-related information, and connection information having a dendrite identifier contained in the delete soma-related information, from the connection information storage unit 13. In the case of deleting the soma-related information from the soma-related information storage unit 11, the apoptosis processing unit 42 may delete connection information to an axon and a dendrite connected to a soma corresponding to the soma-related information.

Furthermore, the apoptosis processing unit 42 may delete the axon information. The apoptosis processing unit 42 may delete the dendrite information. If a soma does not undergo apoptosis, and only an axon or a dendrite undergoes apoptosis, for example, the apoptosis processing unit 42 deletes axon information of the axon that undergoes apoptosis or dendrite information of the dendrite undergoes apoptosis, from the soma-related information. In this case, for example, it is preferable that the apoptosis processing unit 42 deletes connection information having an axon identifier of the axon that undergoes apoptosis or connection information having a dendrite identifier of the dendrite undergoes apoptosis, from the connection information storage unit 13.

Furthermore, it is preferable that the apoptosis processing unit 42 deletes information related to connection with a deleted soma, of a glial cell connected to the soma, from the glial cell information storage unit 14. That is to say for example, the apoptosis processing unit 42 deletes a soma identifier of a deleted soma, from the glial cell information containing the soma identifier. If an axon or a dendrite undergoes apoptosis, or a soma connected to an axon or a dendrite undergoes apoptosis, the apoptosis processing unit 42 deletes an axon identifier of the axon or a dendrite identifier of the dendrite, from the glial cell information containing the axon identifier or the dendrite identifier. That is to say, it is preferable that, in the case in which information of a soma, an axon, or a dendrite is deleted, the apoptosis processing unit 42 deletes information of connection with the soma, the axon, or the dendrite, from the glial cell information.

It is preferable that the apoptosis processing unit 42 deletes the soma-related information from the soma-related information storage unit 11 according to a predetermined condition.

It is preferable that, in the case in which the amount of soma-related information stored in the soma-related information storage unit 11 is large enough to satisfy a predetermined condition, the apoptosis processing unit 42 deletes the soma-related information from the soma-related information storage unit 11.

It is preferable that the apoptosis processing unit 42 determines a soma that is not connected to another soma, a dendrite, or an axon, and deletes soma-related information having a soma identifier of the determined soma, from the soma-related information storage unit 11. For example, the apoptosis processing unit 42 checks the connection information storage unit 13, acquires a soma identifier that appeared for the number of times that is less than or equal to a threshold value or is less than a threshold value, and deletes the soma-related information containing the soma identifier from the soma-related information storage unit 11. For example, the apoptosis processing unit 42 checks the soma-related information storage unit 11, and deletes soma-related information only having dendrite information that is less than or equal to a threshold value or is less than a threshold value or axon information that is less than or equal to a threshold value or is less than a threshold value, from the soma-related information storage unit 11.

It is preferable that the apoptosis processing unit 42 determines a soma connected to an axon that does not reach a predetermined goal, and deletes soma-related information having a soma identifier of the determined soma, from the soma-related information storage unit 11. For example, the apoptosis processing unit 42 checks the soma-related information storage unit 11, compares axon positional information contained in the soma-related information and goal information, determines a soma connected to an axon that does not reach a predetermined goal, and deletes soma-related information having a soma identifier of the determined soma, from the soma-related information storage unit 11.

It is preferable that the apoptosis processing unit 42 determines a soma identifier of a soma that has fired for the number of times that is small enough to satisfy a predetermined condition, using the one or more pieces of firing information in the firing information storage unit 19, and deletes soma-related information having the soma identifier, from the soma-related information storage unit 11. For example, the apoptosis processing unit 42 determines a soma identifier that appeared for the number of times that is less than or equal to a threshold value or is less than a threshold value, and deletes soma-related information having the soma identifier, from the soma-related information storage unit 11.

The apoptosis processing unit 42 deletes information related to an axon or information related to a dendrite according to a predetermined condition. The information related to an axon is, for example, connection information containing axon information or an axon identifier, or an axon identifier in glial cell information. The information related to a dendrite is, for example, connection information containing dendrite information or a dendrite identifier, or a dendrite identifier in glial cell information.

For example, if it is judged that the state has reached a saturated state and judges that there is an axon or a dendrite connected to nowhere, the apoptosis processing unit 42 deletes information related to the axon or information related to the dendrite. The reaching a saturated state is a state in which the number of pieces of information, of one or more of the soma-related information, the axon information, the dendrite information, and the glial cell information, is large enough to satisfy a predetermined condition. That is to say, this is a state in which the amount of elements in a space of the information processing apparatus A (apparatus for simulating the brain) is large enough to satisfy a condition, and the free space therein is less than or equal to a threshold value or is less than a threshold value. The elements are somas, axons, dendrites, glial cells, synapses, or spines.

The firing information accumulating unit 43 configures firing information having a soma identifier for identifying a soma judged by the judging unit 34 as a soma that fires, and accumulates the firing information in the firing information storage unit 19. For example, the firing information accumulating unit 43 acquires a soma identifier for identifying a soma judged by the judging unit 34 as a soma that fires and acquires timer information indicating the current time from an unshown timer, configures firing information having the soma identifier and the timer information, and accumulates the firing information in the firing information storage unit 19.

The output unit 5 outputs various types of information. The various types of information are, for example, output information. In this example, the output is a concept that encompasses display on a display screen, projection using a projector, printing by a printer, output of a sound, output of a vibration using a vibrator, transmission to an external apparatus, accumulation in a storage medium, delivery of a processing result to another processing apparatus or another program, and the like.

The information output unit 51 outputs the output information acquired by the output information acquiring unit 37. There is no limitation on the output destination of the output information. The output information may be output to the outside of the information processing apparatus A, or may be delivered to another process in the information processing apparatus A, for example.

The storage unit 1, the soma-related information storage unit 11, the soma group information storage unit 12, the connection information storage unit 13, the glial cell information storage unit 14, the firing start point information storage unit 15, the output management information storage unit 16, the learning condition storage unit 17, the learning information storage unit 18, the firing information storage unit 19, and the used connection information storage unit 20 are preferably non-volatile storage media, but may be realized also by volatile storage media.

There is no limitation on the procedure in which information is stored in the storage unit 1 and the like. For example, information may be stored in the storage unit 1 and the like via a storage medium, information transmitted via a communication line or the like may be stored in the storage unit 1 and the like, or information input via an input device may be stored in the storage unit 1 and the like.

The processing unit 3, the feature information acquiring unit 31, the information transfer unit 32, the soma calculating unit 33, the judging unit 34, the firing probability changing unit 35, the firing pattern acquiring unit 36, the output information acquiring unit 37, the control unit 38, the learning detecting unit 39, the learning information accumulating unit 40, the growth unit 41, the apoptosis processing unit 42, and the firing information accumulating unit 43 may be realized typically by MPUs, memories, or the like. Typically the processing procedure of the processing unit 3 and the like is realized by software, and the software is stored in a storage medium such as a ROM. Note that the processing procedure may be realized also by hardware (dedicated circuits).

The output unit 5 and the information output unit 51 may be considered to include or not to include an output device, such as a display screen or a speaker. The output unit 5 and the like may be realized, for example, by driver software for an output device, a combination of driver software for an output device and the output device, or the like.

Next, an operation example of the information processing apparatus A will be described with reference to the flowchart in FIG. 3.

(Step S301) The input information accepting unit 21 accepts external information, and temporarily stores it in the storage unit 1. In this example, the input information accepting unit 21 may not accept external information.

(Step S302) The input information accepting unit 21 judges whether or not it has accepted input information. If it has accepted input information, the procedure advances to step S303, and, if not, the procedure advances to step S304.

(Step S303) The information processing apparatus A performs firing transfer processing. The procedure returns to step S301. The firing transfer processing is processing for transferring information between somas. Later, an example of the firing transfer processing will be described in detail with reference to the flowchart in FIG. 4.

(Step S304) The processing unit 3 judges whether or not to perform firing pattern processing. If firing pattern processing is to be performed, the procedure advances to step S305, and, if not, the procedure advances to step S306. The processing unit 3 may always judge to perform firing pattern processing, or may judge to perform firing pattern processing at predetermined intervals. There is no limitation on the conditions for judging whether or not to perform firing pattern processing.

(Step S305) The information processing apparatus A performs firing pattern processing. The procedure returns to step S301. The firing pattern processing is processing performed using a firing pattern, and, for example, includes processing for determining output information using a firing pattern and outputting the output information, and learning processing. Later, an example of the firing pattern processing will be described in detail with reference to the flowchart in FIG. 6.

(Step S306) The processing unit 3 judges whether or not to perform growth processing and apoptosis processing. If growth processing and the like are to be performed, the procedure advances to step S307, and, if not, the procedure returns to step S301. The processing unit 3 may always judge to perform growth processing and the like, or may judge to perform growth processing and the like at predetermined intervals. There is no limitation on the conditions for judging whether or not to perform growth processing and the like. It is also possible to perform the growth processing and the apoptosis processing as a set, or to individually judge whether or not to perform them.

(Step S307) The growth unit 41 performs soma growth processing. The soma growth processing will be described with reference to the flowchart in FIG. 7.

(Step S308) The growth unit 41 performs axon growth processing. The axon growth processing will be described with reference to the flowchart in FIG. 8.

(Step S309) The growth unit 41 performs dendrite growth processing. The dendrite growth processing will be described with reference to the flowchart in FIG. 9.

(Step S310) The growth unit 41 performs soma connection processing. The soma connection processing will be described with reference to the flowchart in FIG. 10.

(Step S311) The growth unit 41 performs glial cell growth processing. The glial cell growth processing will be described with reference to the flowchart in FIG. 11.

(Step S312) The apoptosis processing unit 42 performs apoptosis processing. The procedure returns to step S301. The apoptosis processing will be described with reference to the flowchart in FIG. 12.

Figure 3:
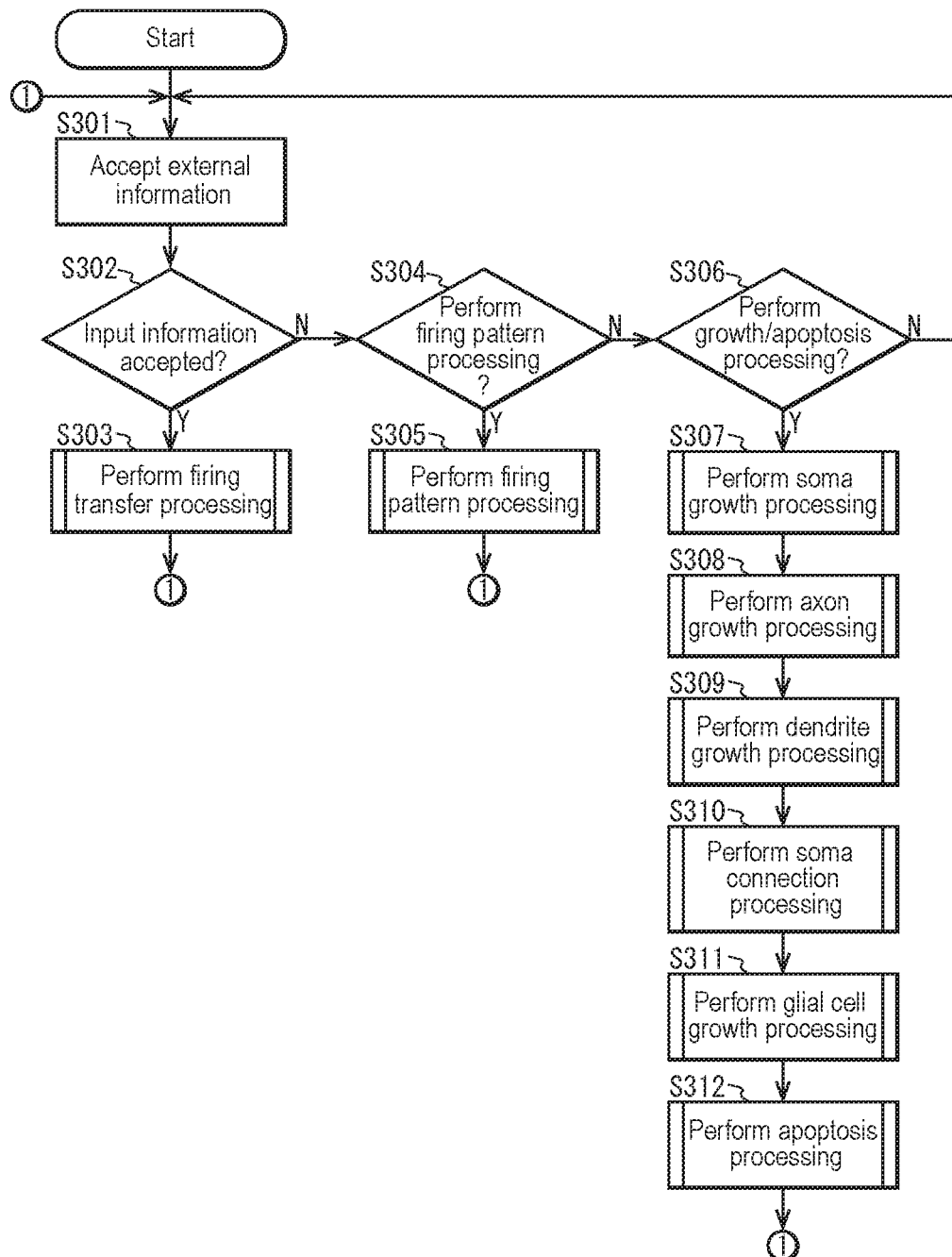
FIG. 3 is a flowchart illustrating an operation example of the information processing apparatus A in the embodiment.

In the flowchart in FIG. 3, it is preferable to perform the firing transfer processing, the firing pattern processing, the growth processing, the apoptosis processing, and the like in parallel. Also, it is preferable to perform the firing transfer processing in somas in parallel.

Note that the procedure is terminated by powering off or an interruption at the end of the process in the flowchart in FIG. 3.

Figure 4:
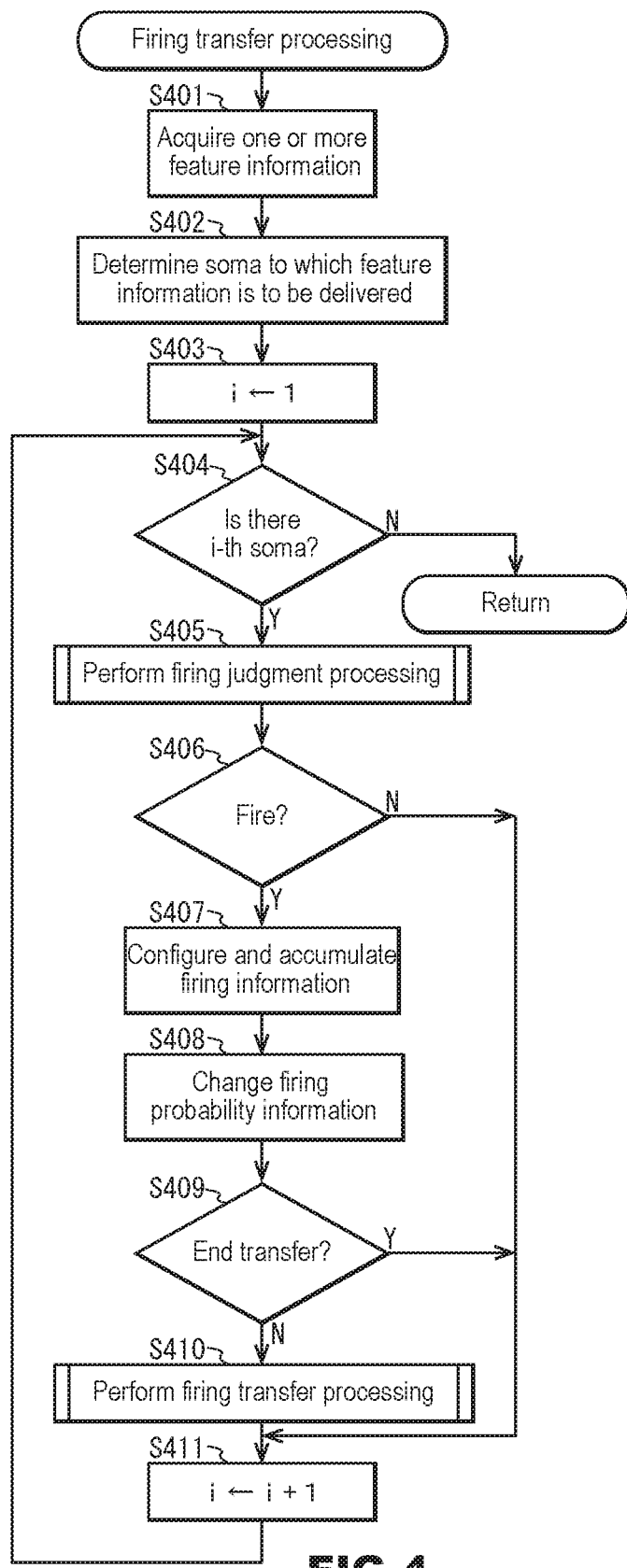
FIG. 4 is a flowchart illustrating an example of firing transfer processing in the embodiment.

Hereinafter, an example of the firing transfer processing in step S303 will be described in detail with reference to the flowchart in FIG. 4.

(Step S401) The feature information acquiring unit 31 acquires one or more pieces of feature information. The feature information acquiring unit 31 acquires one or more pieces of feature information, for example, using any one of the methods (1) to (3) below. (1) The feature information acquiring unit 31 analyzes the input information accepted in step S201, thereby acquiring one or more pieces of feature information. In this example, the one or more pieces of feature information are, for example, one or more pairs of an information identifier and an information amount. (2) The information transfer unit 32 acquires one or more pieces of feature information applied to soma-related information of a soma judged as a soma that fires. In this example, the one or more pieces of feature information are, for example, one information amount. (3) The information transfer unit 32 acquires one or more pieces of feature information, from one or more pieces of feature information applied to soma-related information of a soma judged as a soma that fires. In (3), the information transfer unit 32 calculates each of the one or more pieces of feature information accepted by a soma judged as a soma that fires, using a predetermined calculation formula, thereby acquiring one or more pieces of feature information. Examples of the calculation include addition.

(Step S402) The information transfer unit 32 determines one or more somas to which the one or more pieces of feature information acquired in step S401 are to be delivered. Such somas are determined, for example, using any one of the methods (1) to (3) below. (1) The information transfer unit 32 acquires soma identifiers of predetermined one or more somas, from the soma-related information in the soma-related information storage unit 11. The soma identifiers of predetermined one or more somas are stored, for example, in the storage unit 1, and the information transfer unit 32 acquires such one or more soma identifiers from the storage unit 1. The one or more soma identifiers are soma identifiers of somas that first accept one or more pieces of feature information acquired from the input information accepted from the outside. (2) The information transfer unit 32 acquires, from the firing start point information storage unit 15, one or more soma identifiers that are respectively paired with information identifiers contained in the feature information acquired by the feature information acquiring unit 31. (3) The information transfer unit 32 acquires soma identifiers of one or more somas connected to an end of a soma that is to be processed, referring to the connection information storage unit 13. That is to say for example, the information transfer unit 32 realizes the processing (3) through any one of the processes (a) to (c) below. (a) The information transfer unit 32 acquires, for example, dendrite identifiers that are respectively paired with one or more axon identifiers contained in soma-related information of a soma that is to be processed, from the connection information storage unit 13. The information transfer unit 32 acquires, for example, one or more soma identifiers contained in soma-related information having the acquired one or more dendrite identifiers, from the soma-related information storage unit 11. (b) The information transfer unit 32 acquires, for example, one or more soma identifiers that are respectively paired with soma identifiers contained in soma-related information of a soma that is to be processed, from the connection information storage unit 13. (c) The information transfer unit 32 acquires, for example, spine identifiers that are respectively paired with one or more synapse identifiers contained in soma-related information of a soma that is to be processed, from the connection information storage unit 13. The information transfer unit 32 acquires, for example, one or more soma identifiers contained in soma-related information having the acquired one or more spine identifiers, from the soma-related information storage unit 11.

(Step S403) The processing unit 3 substitutes 1 for a counter i.

(Step S404) The processing unit 3 judges whether or not there is an $i^{-th}$ soma in the one or more somas determined in step S402. If there is an $i^{-th}$ soma, the procedure advances to step S405, and, if not, the procedure returns to the upper-level processing. Typically the processing unit 3 judges whether or not there is an $i^{-th}$ soma, based on whether or not there is an $i^{-th}$ soma identifier in the soma identifiers acquired in step S402.

(Step S405) The judging unit 34 performs firing judgment processing. The firing judgment processing will be described in detail with reference to the flowchart in FIG. 5.

(Step S406) If the judgment result in step S405 is "a soma fires", the processing unit 3 causes the procedure to advance to step S407, and, if not, the procedure advances to step S411.

(Step S407) The firing information accumulating unit 43 configures firing information having a soma identifier for identifying a soma judged by the judging unit 34 as a soma that fires. The firing information accumulating unit 43 accumulates the firing information in the firing information storage unit 19. In this example, it is preferable that the firing information accumulating unit 43 acquires timer information from an unshown timer, configures firing information having the soma identifier and the timer information, and accumulates it in the firing information storage unit 19.

(Step S408) The firing probability changing unit 35 changes the firing probability information that is paired with a soma identifier of the soma judged by the judging unit 34 as a soma that fires, so as to increase the firing probability. The firing probability information that is changed is information that is stored in the soma-related information storage unit 11.

(Step S409) The processing unit 3 judges whether or not to end feature information transfer to a soma that is at an end of the $i^{-th}$ soma or a soma group that is at an end of the $i^{-th}$ soma. If the transfer is to be ended, the procedure advances to step S411, and, if not, the procedure advances to step S410. The processing unit 3 judges whether or not there is a soma that is at an end of the $i^{-th}$ soma, for example, referring to the connection information storage unit 13. If there is no soma that is at an end of the soma, the feature information transfer is ended. If there is no dendrite that is at an end of an axon connected to the soma, information transfer is performed from the soma to the axon, but, there is no part that receives the information from the axon, and thus the information transfer is stopped. Also in this case, the processing unit 3 judges to end the feature information transfer.

(Step S410) The processing unit 3 performs firing transfer processing to the soma that is at an end of the $i^{-th}$ soma or the soma group that is at an end of the $i^{-th}$ soma. This processing is firing transfer processing. That is to say the firing transfer processing is recursive processing.

(Step S411) The processing unit 3 increments the counter i by 1. The procedure returns to step S404.

Figure 5:
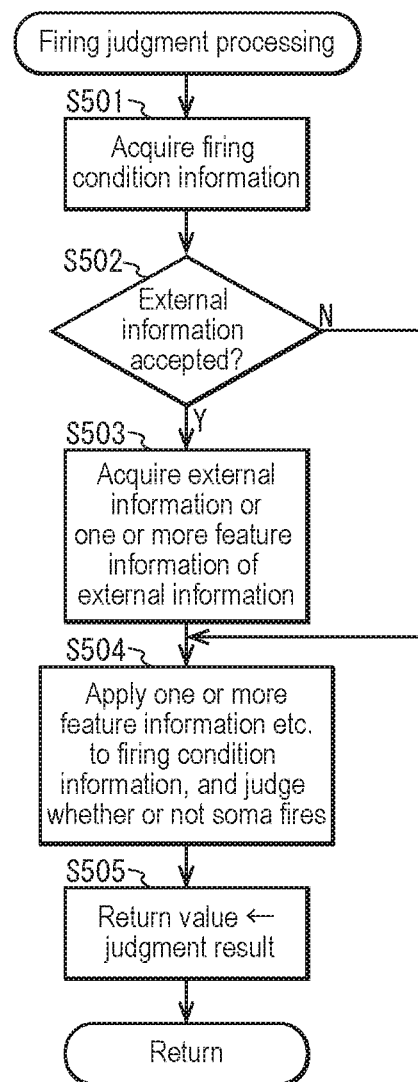
FIG. 5 is a flowchart illustrating an example of firing judgment processing in the embodiment.

Next, the firing judgment processing in step S405 will be described detail with reference to the flowchart in FIG. 5.

(Step S501) The judging unit 34 acquires firing condition information contained in soma-related information of the soma that is to be processed, from the soma-related information storage unit 11.

(Step S502) The judging unit 34 judges whether or not external information has been accepted in step S301. If external information has been accepted, the procedure advances to step S503, and, if not, the procedure advances to step S504.

(Step S503) The judging unit 34 acquires the external information accepted in step S302, or one or more pieces of feature information acquired from the external information. The processing for acquiring one or more pieces of feature information from external information may be performed by the feature information acquiring unit 31, or may be performed by the judging unit 34 or the like.

(Step S504) The judging unit 34 applies the one or more pieces of feature information and the like to the firing condition information acquired in step S501, and judges whether or not the soma fires. The one or more pieces of feature information and the like are one or more pieces of feature information, or one or more pieces of feature information and external information.

(Step S505) The judging unit 34 substitutes the judgment result in step S504 to a variable "return value". The procedure returns to the upper-level processing.

Next, an example of the firing pattern processing in step S305 will be described in detail with reference to the flowchart in FIG. 6.

(Step S601) The firing pattern acquiring unit 36 acquires a firing pattern having one or more soma identifiers, referring to the firing information storage unit 19. It is preferable that the firing pattern acquiring unit 36 also acquires a firing pattern corresponding to input information or one or more pieces of feature information acquired from the input information, from the learning information storage unit 18. That is to say it is preferable to use a firing pattern obtained through learning in association with input information as well to the following processing.

(Step S602) The output information acquiring unit 37 judges whether or not external information has been accepted in step S301. If external information has been accepted, the procedure advances to step S603, and, if not, the procedure advances to step S604.

(Step S603) The output information acquiring unit 37 acquires the external information accepted in step S301, or one or more pieces of feature information acquired from the external information. The processing for acquiring one or more pieces of feature information from external information may be performed by the feature information acquiring unit 31, or may be performed by the output information acquiring unit 37 or the like. The external information accepted in step S301 is typically external information that is stored in the storage unit 1.

(Step S604) The output information acquiring unit 37 substitutes 1 for a counter i.

(Step S605) The output information acquiring unit 37 judges whether or not there is an $i^{-th}$ piece of output management information in the output management information storage unit 16. If there is an $i^{-th}$ piece of output management information, the procedure advances to step S606, and, if not, the procedure advances to step S611.

(Step S606) The output information acquiring unit 37 acquires an output condition contained in the $i^{-th}$ piece of output management information, from the output management information storage unit 16.

(Step S607) The output information acquiring unit 37 judges whether or not, the firing pattern acquired in step S601, or the firing pattern acquired in step S601 and the information acquired in step S603 match the output condition acquired in step S606. If they match the output condition, the procedure advances to step S608, and, if not, the procedure advances to step S610.

(Step S608) The output information acquiring unit 37 acquires output information contained in the piece of output management information.

(Step S609) The information output unit 51 outputs the output information acquired in step S608.

(Step S610) The output information acquiring unit 37 increments the counter i by 1. The procedure returns to step S605.

(Step S611) The learning information accumulating unit 40 acquires input information or the one or more pieces of feature information acquired from the input information.

(Step S612) The learning detecting unit 39 substitutes 1 for a counter i.

(Step S613) The learning detecting unit 39 judges whether or not there is an $i^{-th}$ learning condition in the learning condition storage unit 17. If there is an $i^{-th}$ learning condition, the procedure advances to step S614, and, if not, the procedure advances to step S617.

(Step S614) The learning detecting unit 39 judges whether or not the firing pattern acquired in step S601 matches the $i^{-th}$ learning condition. If they match each other, the procedure advances to step S615, and, if not, the procedure advances to step S617.

(Step S615) The learning information accumulating unit 40 acquires one or more soma identifiers that are to be accumulated, from the firing pattern acquired in step S601. The learning information accumulating unit 40 configures learning information having the one or more soma identifiers, and the input information or one or more pieces of feature information acquired in step S611. The one or more soma identifiers are a firing pattern.

(Step S616) The learning information accumulating unit 40 accumulates the learning information configured in step S615.

(Step S617) The learning detecting unit 39 increments the counter i by 1. The procedure returns to step S613.

Figure 6:
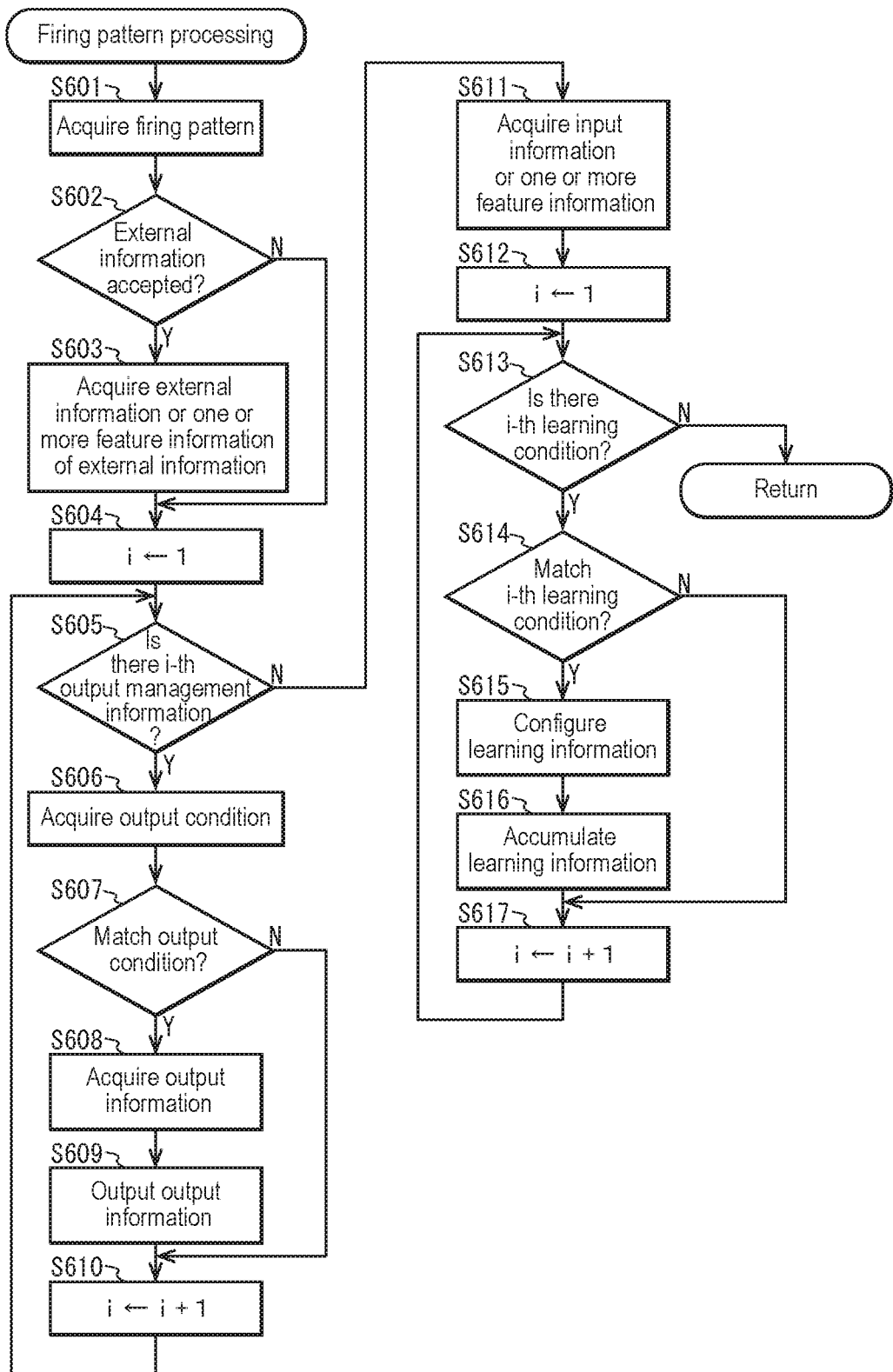
FIG. 6 is a flowchart illustrating the details of an example of firing pattern processing in the embodiment.

In the flowchart in FIG. 6, the processing in steps S601 to S610 is output processing of output information, and the processing in steps S611 to step S617 is learning processing.

Figure 7:
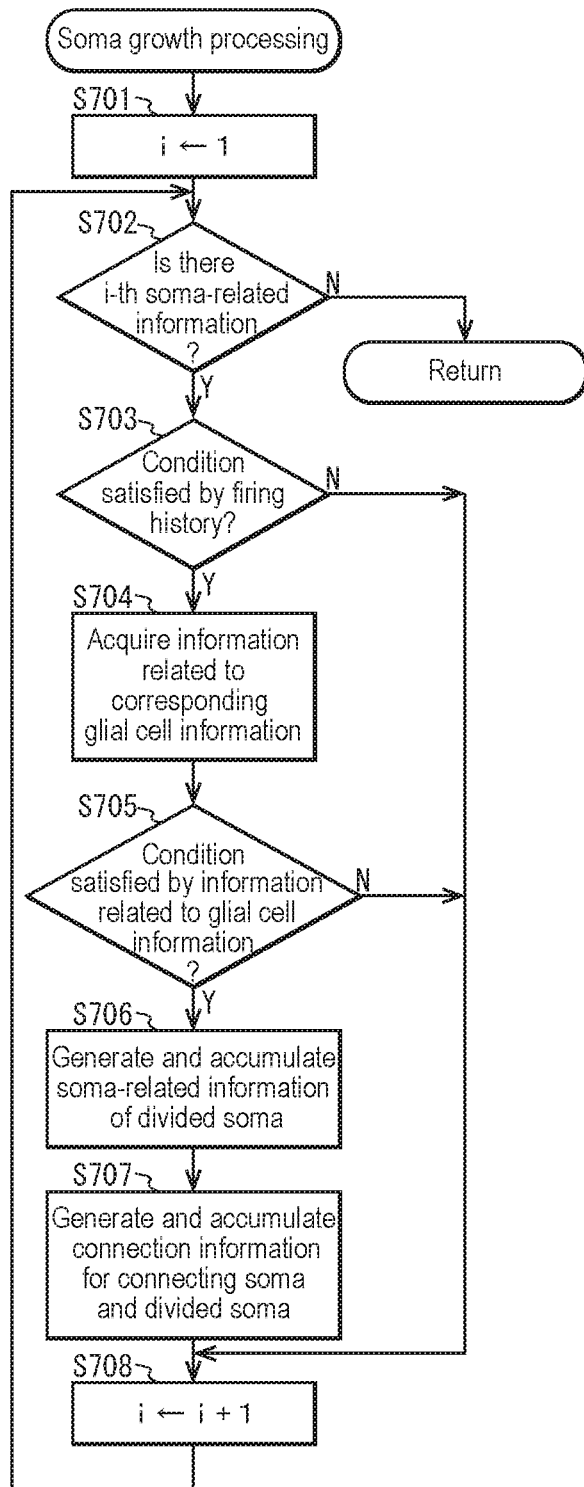
FIG. 7 is a flowchart illustrating an example of soma growth processing in the embodiment.

Next, an example of the soma growth processing in step S307 will be described with reference to the flowchart in FIG. 7.

(Step S701) The growth unit 41 substitutes 1 for a counter i.

(Step S702) The growth unit 41 judges whether or not there is an $i^{-th}$ piece of soma-related information in the soma-related information storage unit 11. If there is an $i^{-th}$ piece of soma-related information, the procedure advances to step S703, and, if not, the procedure returns to the upper-level processing.

(Step S703) The growth unit 41 acquires firing information corresponding to an $i^{-th}$ soma identifier contained in the $i^{-th}$ piece of soma-related information, from the firing information storage unit 19. The firing information is a history of firing of the $i^{-th}$ soma. The growth unit 41 judges whether or not the acquired firing information satisfies a condition. If the firing information satisfies a condition, the procedure advances to step S704, and, if not, the procedure advances to step S708. The growth unit 41 judges from the acquired firing information that it satisfies a condition, for example, if a soma is firing well enough to satisfy a predetermined condition. That is to say, the growth unit 41 judges whether or not the number of pieces of firing information containing the soma identifier is large enough to satisfy a predetermined condition. If the number is large, it is judged that the condition is satisfied. The firing information that is acquired by the growth unit 41 may be, for example, firing information having timer information within a predetermined period from the current time.

(Step S704) The growth unit 41 acquires information related to glial cell information corresponding to the $i^{-th}$ soma. In this example, the information related to glial cell information may be glial cell information of one or more glial cells connected to the $i^{-th}$ soma, or may be the number of glial cells connected to the $i^{-th}$ soma, or the like.

(Step S705) The growth unit 41 judges whether or not the information related to glial cell information acquired in step S704 satisfies a predetermined condition. If the information satisfies a condition, the procedure advances to step S706, and, if not, the procedure advances to step S708. The predetermined condition is a condition for generating a child soma. The predetermined condition is a case in which the information related to glial cell information is information indicating that the number of glial cells is large enough to satisfy a predetermined condition. For example, the growth unit 41 calculates the number of glial cell identifiers that are each paired with the $i^{-th}$ soma identifier, and, if the number is greater than or equal to a threshold value or is greater than a threshold value, judges that the information satisfies the predetermined condition. In this example, it is also possible that the growth unit 41 judges that the information satisfies the condition if the number of elements, among the number of pieces of soma-related information, the number of pieces of axon information, the number of pieces of dendrite information, and the like, is less than a threshold value or is less than or equal to a threshold value.

(Step S706) The growth unit 41 generates soma-related information of a divided soma obtained by dividing the $i^{-th}$ soma, and accumulates it in the soma-related information storage unit 11. There is no limitation on the algorithm for the growth unit 41 to generate soma-related information of a child soma.

(Step S707) The growth unit 41 generates connection information for connecting the $i^{-th}$ soma and the divided soma generated in step S706, and accumulates it in the connection information storage unit 13.

(Step S708) The growth unit 41 increments the counter i by 1. The procedure returns to step S702.

Figure 8:
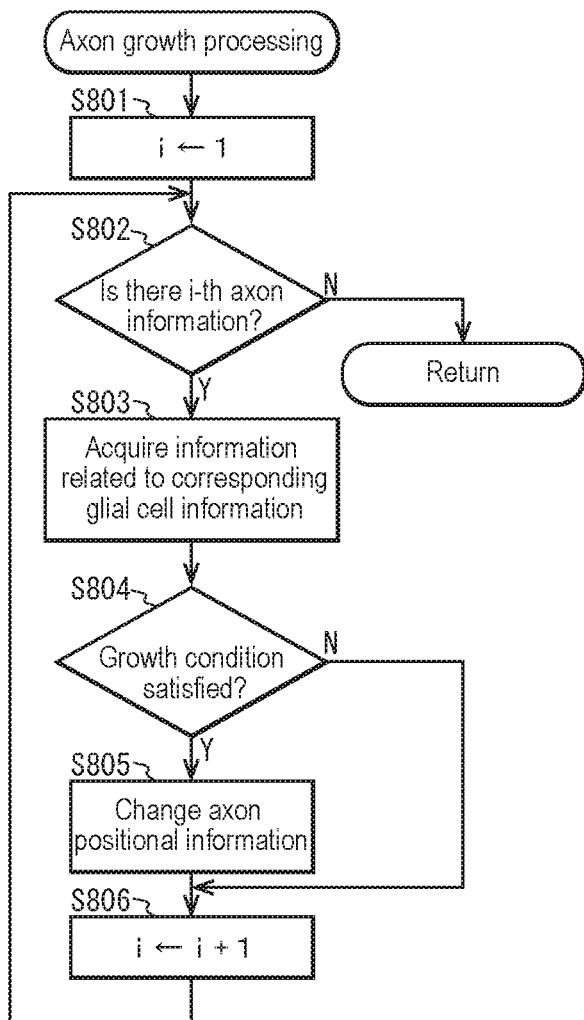
FIG. 8 is a flowchart illustrating an example of axon growth processing in the embodiment.

Next, an example of the axon growth processing in step S308 will be described with reference to the flowchart in FIG. 8.

(Step S801) The growth unit 41 substitutes 1 for a counter i.

(Step S802) The growth unit 41 judges whether or not there is an $i^{-th}$ piece of axon information in the soma-related information storage unit 11. If there is an $i^{-th}$ piece of axon information, the procedure advances to step S803, and, if not, the procedure returns to the upper-level processing.

(Step S803) The growth unit 41 acquires information related to glial cell information corresponding to the $i^{-th}$ piece of axon information. In this example, the information related to glial cell information may be glial cell information of one or more glial cells connected to an $i^{-th}$ axon, or may be the number of glial cells connected to the $i^{-th}$ axon, or the like.

(Step S804) The growth unit 41 judges whether or not the information related to glial cell information acquired in step S803 satisfies a predetermined condition. If the information satisfies a condition, the procedure advances to step S805, and, if not, the procedure advances to step S806. The predetermined condition is a condition for allowing an axon to extend. The predetermined condition is a case in which the information related to glial cell information is information indicating that the number of glial cells is large enough to satisfy a predetermined condition.

(Step S805) The growth unit 41 changes the axon positional information contained in the $i^{-th}$ piece of axon information, so as to allow the axon to extend.

(Step S806) The growth unit 41 increments the counter i by 1. The procedure returns to step S802.

Figure 9:
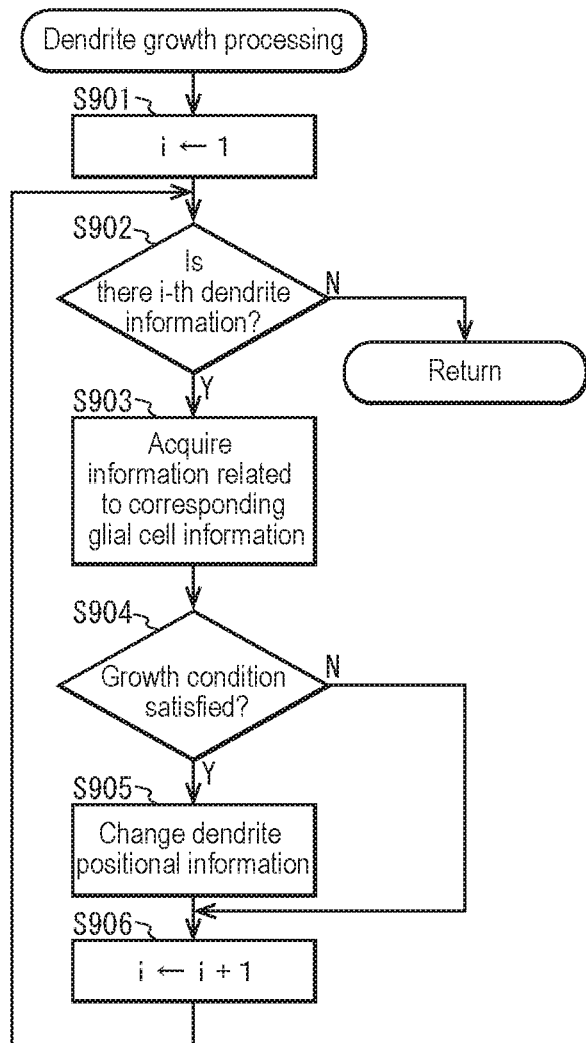
FIG. 9 is a flowchart illustrating an example of dendrite growth processing in the embodiment.

Next, the dendrite growth processing in step S309 will be described with reference to the flowchart in FIG. 9.

(Step S901) The growth unit 41 substitutes 1 for a counter i.

(Step S902) The growth unit 41 judges whether or not there is an $i^{-th}$ piece of dendrite information in the soma-related information storage unit 11. If there is an $i^{-th}$ piece of dendrite information, the procedure advances to step S903, and, if not, the procedure returns to the upper-level processing.

(Step S903) The growth unit 41 acquires information related to glial cell information corresponding to the $i^{-th}$ piece of dendrite information. In this example, the information related to glial cell information may be glial cell information of one or more glial cells connected to an $i^{-th}$ dendrite, or may be the number of glial cells connected to the $i^{-th}$ dendrite, or the like.

(Step S904) The growth unit 41 judges whether or not the information related to glial cell information acquired in step S903 satisfies a predetermined condition. If the information satisfies a condition, the procedure advances to step S905, and, if not, the procedure advances to step S906. The predetermined condition is a condition for allowing a dendrite to extend. The predetermined condition is a case in which the information related to glial cell information is information indicating that the number of glial cells is large enough to satisfy a predetermined condition.

(Step S905) The growth unit 41 changes the dendrite positional information contained in the $i^{-th}$ piece of dendrite information, so as to allow the dendrite to extend.

(Step S906) The growth unit 41 increments the counter i by 1. The procedure returns to step S902.

Figure 10:
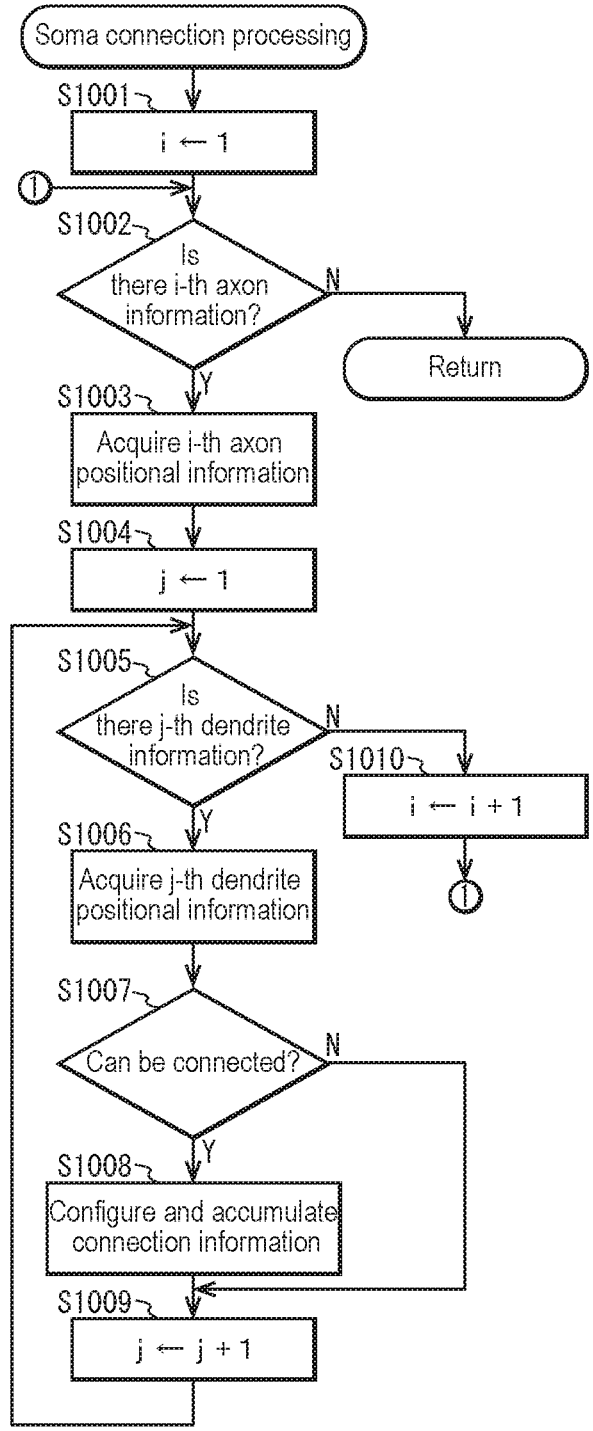
FIG. 10 is a flowchart illustrating an example of soma connection processing in the embodiment.

Next, the soma connection processing in step S310 will be described with reference to the flowchart in FIG. 10.

(Step S1001) The growth unit 41 substitutes 1 for a counter i.

(Step S1002) The growth unit 41 judges whether or not there is an $i^{-th}$ piece of axon information in the soma-related information storage unit 11. If there is an $i^{-th}$ piece of axon information, the procedure advances to step S1003, and, if not, the procedure returns to the upper-level processing.

(Step S1003) The growth unit 41 acquires axon positional information contained in the $i^{-th}$ piece of axon information, from the soma-related information storage unit 11.

(Step S1004) The growth unit 41 substitutes 1 for a counter j.

(Step S1005) The growth unit 41 judges whether or not there is a $j^{-th}$ piece of dendrite information that is not input to a soma connected to the $i^{-th}$ axon and that is dendrite information of a dendrite, in the soma-related information storage unit 11. If there is a $j^{-th}$ piece of dendrite information, the procedure advances to step S1006, and, if not, the procedure advances to step S1010.

(Step S1006) The growth unit 41 acquires dendrite positional information contained in the $j^{-th}$ piece of dendrite information, from the soma-related information storage unit 11.

(Step S1007) The growth unit 41 judges whether or not the $i^{-th}$ axon and the $j^{-th}$ dendrite can be connected to each other, using the axon positional information contained in the $i^{-th}$ piece of axon information and the dendrite positional information contained in the $j^{-th}$ piece of dendrite information. If they can be connected to each other, the procedure advances to step S1008, and, if not, the procedure advances to step S1009. For example, the growth unit 41 judges that the $i^{-th}$ axon and the $j^{-th}$ dendrite can be connected to each other, if it is determined that there is an overlapping point between the axon positional information contained in the $i^{-th}$ piece of axon information and the dendrite positional information contained in the $j^{-th}$ piece of dendrite information. For example, the growth unit 41 judges that the $i^{-th}$ axon and the $j^{-th}$ dendrite can be connected to each other, if it is determined that the position at an end of an axon indicated by the axon positional information contained in the $i^{-th}$ piece of axon information and the position at an end of a dendrite indicated by the dendrite positional information contained in the $j^{-th}$ piece of dendrite information match each other or are within a distance that is less than or equal to a threshold value or is less than a threshold value.

(Step S1008) The growth unit 41 configures connection information for specifying connection between the $i^{-th}$ axon and the $j^{-th}$ dendrite, and accumulates it in the connection information storage unit 13. For example, the growth unit 41 configures connection information having an axon identifier contained in the $i^{-th}$ piece of axon information and a dendrite identifier contained in the $j^{-th}$ piece of dendrite information, and accumulates it in the connection information storage unit 13.

(Step S1009) The growth unit 41 increments the counter j by 1. The procedure returns to step S1005.

(Step S1010) The growth unit 41 increments the counter i by 1. The procedure returns to step S1002.

Figure 11:
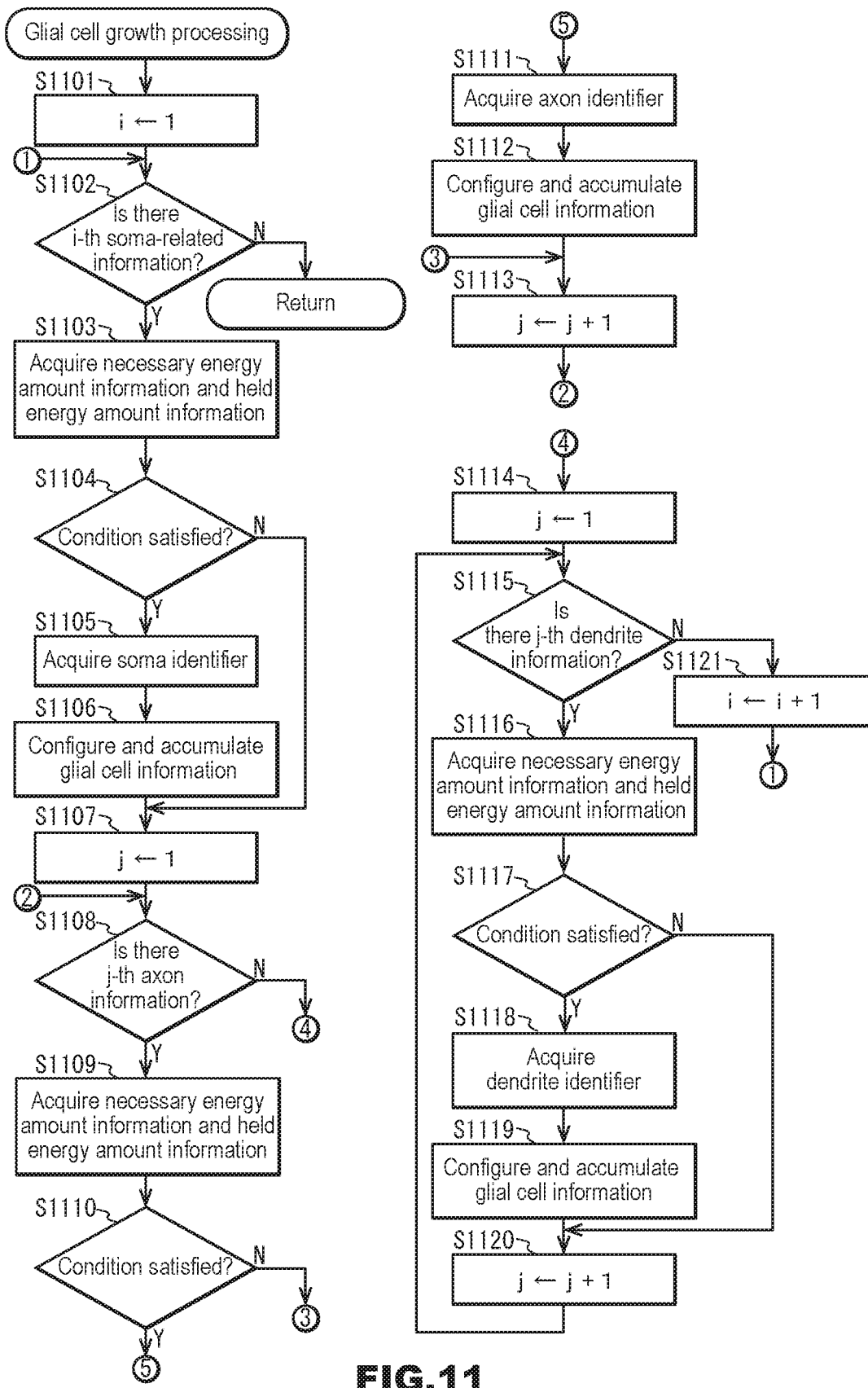
FIG. 11 is a flowchart illustrating an example of glial cell growth processing in the embodiment.

Next, the glial cell growth processing in step S311 will be described with reference to the flowchart in FIG. 11.

(Step S1101) The growth unit 41 substitutes 1 for a counter i.

(Step S1102) The growth unit 41 judges whether or not there is an $i^{-th}$ piece of soma-related information in the soma-related information storage unit 11. If there is an $i^{-th}$ piece of soma-related information, the procedure advances to step S1103, and, if not, the procedure returns to the upper-level processing.

(Step S1103) The growth unit 41 acquires the necessary energy amount information and the held energy amount information contained in the $i^{-th}$ piece of soma-related information.

(Step S1104) The growth unit 41 judges whether or not the necessary energy amount information and the held energy amount information acquired in step S1103 satisfy a predetermined condition. If they satisfy a predetermined condition, the procedure advances to step S1105, and, if not, the procedure advances to step S1107.

(Step S1105) The growth unit 41 acquires a soma identifier contained in the $i^{-th}$ piece of soma-related information.

(Step S1106) The growth unit 41 configures glial cell information having the soma identifier acquired in step S1105, and accumulates it in the glial cell information storage unit 14.

(Step S1107) The growth unit 41 substitutes 1 for a counter j.

(Step S1108) The growth unit 41 judges whether or not there is a $j^{-th}$ piece of axon information in the $i^{-th}$ piece of soma-related information. If there is a $j^{-th}$ piece of axon information, the procedure advances to step S1109, and, if not, the procedure advances to step S1114.

(Step S1109) The growth unit 41 acquires the necessary energy amount information and the held energy amount information contained in the $j^{-th}$ piece of axon information.

(Step S1110) The growth unit 41 judges whether or not the necessary energy amount information and the held energy amount information acquired in step S1109 satisfy a predetermined condition. If they satisfy a predetermined condition, the procedure advances to step S1111, and, if not, the procedure advances to step S1113.

(Step S1111) The growth unit 41 acquires an axon identifier of the $j^{-th}$ piece of axon information.

(Step S1112) The growth unit 41 configures glial cell information having the axon identifier acquired in step S1111, and accumulates it in the glial cell information storage unit 14.

(Step S1113) The growth unit 41 increments the counter j by 1. The procedure returns to step S1108.

(Step S1114) The growth unit 41 substitutes 1 for a counter j.

(Step S1115) The growth unit 41 judges whether or not there is a $j^{-th}$ piece of dendrite information in the $i^{-th}$ piece of soma-related information. If there is a $j^{-th}$ piece of dendrite information, the procedure advances to step S1116, and, if not, the procedure advances to step S1121.

(Step S1116) The growth unit 41 acquires the necessary energy amount information and the held energy amount information contained in the $j^{-th}$ piece of dendrite information.

(Step S1117) The growth unit 41 judges whether or not the necessary energy amount information and the held energy amount information acquired in step S1116 satisfy a predetermined condition. If they satisfy a predetermined condition, the procedure advances to step S118, and, if not, the procedure advances to step S1120.

(Step S1118) The growth unit 41 acquires a dendrite identifier of the $j^{-th}$ piece of dendrite information.

(Step S1119) The growth unit 41 configures glial cell information having the dendrite identifier acquired in step S1118, and accumulates it in the glial cell information storage unit 14.

(Step S1120) The growth unit 41 increments the counter j by 1. The procedure returns to step S1115.

(Step S1121) The growth unit 41 increments the counter i by 1. The procedure returns to step S1102.

Figure 12:
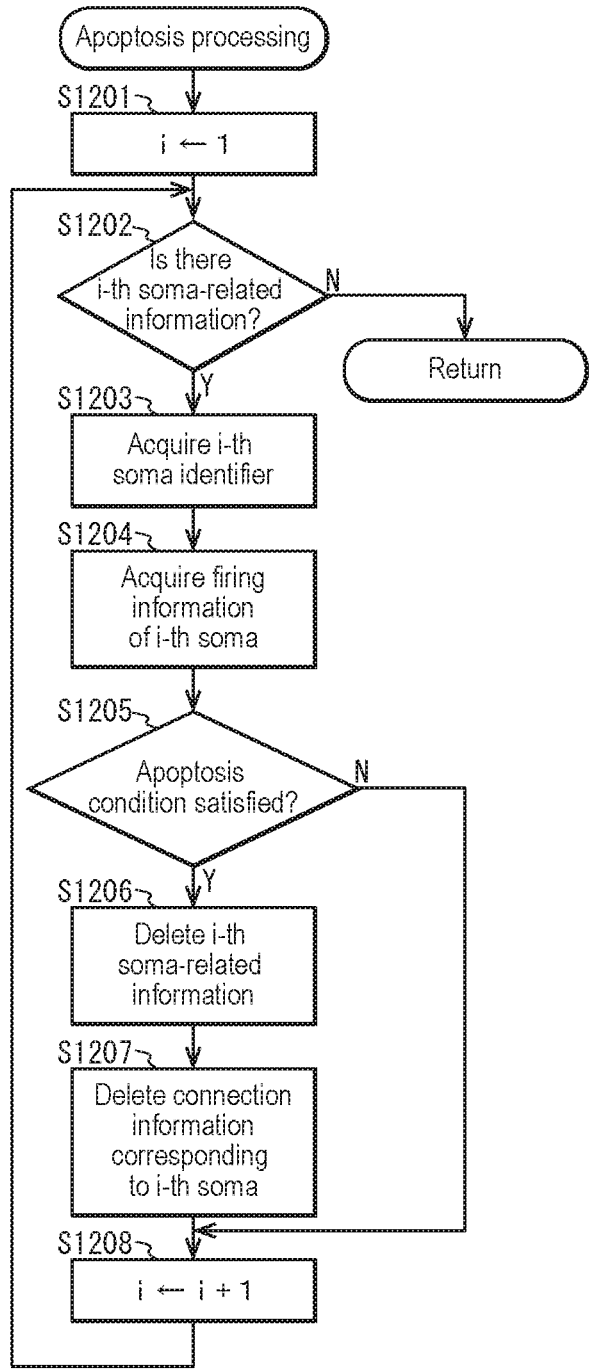
FIG. 12 is a flowchart illustrating an example of apoptosis processing in the embodiment.

Next, the apoptosis processing in step S312 will be described with reference to the flowchart in FIG. 12.

(Step S1201) The apoptosis processing unit 42 substitutes 1 for a counter i.

(Step S1202) The apoptosis processing unit 42 judges whether or not there is an $i^{-th}$ piece of soma-related information in the soma-related information storage unit 11. If there is an $i^{-th}$ piece of soma-related information, the procedure advances to step S1203, and, if not, the procedure returns to the upper-level processing.

(Step S1203) The apoptosis processing unit 42 acquires a soma identifier of the $i^{-th}$ piece of soma-related information from the soma-related information storage unit 11.

(Step S1204) The apoptosis processing unit 42 acquires firing information containing the soma identifier acquired in step S1203, from the firing information storage unit 19. In this example, it is preferable that the firing information that is acquired is firing information having timer information indicating the time that is within a threshold value from the current time or is more recent than a threshold value.

(Step S1205) The apoptosis processing unit 42 judges whether or not an apoptosis condition is satisfied, using the firing information acquired in step S1204. If an apoptosis condition is satisfied, the procedure advances to step S1206, and, if not, the procedure advances to step S1208.

(Step S1206) The apoptosis processing unit 42 deletes the $i^{-th}$ piece of soma-related information from the soma-related information storage unit 11.

(Step S1207) The apoptosis processing unit 42 deletes connection information corresponding to the soma from the connection information storage unit 13.

(Step S1208) The apoptosis processing unit 42 increments the counter i by 1. The procedure returns to step S1202.

As described above, according to this embodiment, it is possible to realize an information processing apparatus for simulating processing in the brain.

Furthermore, according to this embodiment, it is possible to realize an information processing apparatus for simulating information delivery processing between soma groups.

Furthermore, according to this embodiment, it is possible to realize an information processing apparatus for simulating dendrites and axons in the brain.

Furthermore, according to this embodiment, it is possible to realize an information processing apparatus for simulating synapses and spines in the brain.

Furthermore, according to this embodiment, it is possible to realize an information processing apparatus for simulating processing in the brain in which a soma that has operated once does not operate as long as the length of time that has elapsed is not long enough to satisfy a predetermined condition.

Furthermore, according to this embodiment, it is possible to realize an information processing apparatus for simulating processing in the brain in which a soma that has fired is likely to fire.

Furthermore, according to this embodiment, it is possible to realize an information processing apparatus for simulating processing in the brain in which, even when the same input information is given, output information varies depending on external information.

Furthermore, according to this embodiment, it is possible to realize an information processing apparatus for simulating processing in the brain in which learning of firing patterns is performed.

Furthermore, according to this embodiment, it is possible to realize an information processing apparatus for simulating processing in the brain in which somas and the like grow.

Furthermore, according to this embodiment, it is possible to realize an information processing apparatus for simulating a growth method of somas and the like in the brain.

Furthermore, according to this embodiment, it is possible to realize an information processing apparatus for simulating glial cells in the brain.

Furthermore, according to this embodiment, it is possible to realize an information processing apparatus for simulating processing in the brain in which the number of somas in the brain automatically decreases.

Furthermore, according to this embodiment, it is possible to realize an information processing apparatus for simulating apoptosis of somas in the brain.

Moreover, according to this embodiment, it is possible to realize an information processing apparatus for more specifically simulating growth of somas and the like in the brain.

The processing in this embodiment may be realized by software. The software may be distributed by software downloads or the like. Furthermore, the software may be distributed in a form where the software is stored in a storage medium such as a CD-ROM. Note that the same is applied to other embodiments described in this specification. The software that realizes the information processing apparatus A in this embodiment is the following sort of program. Specifically, this program is a program using a computer-accessible storage medium including: a soma-related information storage unit in which two or more pieces of soma-related information having a soma identifier for identifying a soma, and firing condition information related to a condition for the soma to fire are stored; a connection information storage unit in which one or more pieces of connection information for specifying connection between two or more somas are stored; and an output management information storage unit in which one or more pieces of output management information having an output condition, which is a condition for output using a firing pattern having one or more soma identifiers, and output information, which is information that is output, are stored, the program causing a computer to function as: an input information accepting unit that accepts input information; a feature information acquiring unit that acquires one or more pieces of feature information from the input information; an information transfer unit that acquires the one or more pieces of feature information acquired by the feature information acquiring unit and one or more soma identifiers each for identifying a soma that fires first, and acquires one or more pieces of feature information given from one or more other somas or one or more pieces of feature information acquired from the one or more pieces of feature information, and a soma identifier of each of one or more somas that are to be subjected to judgment of firing; a judging unit that, using the one or more pieces of feature information acquired by the information transfer unit, and firing condition information that is paired with the one or more soma identifiers acquired by the information transfer unit, judges whether or not the soma identified with each of the soma identifiers fires; a firing pattern acquiring unit that acquires a firing pattern containing one or more soma identifiers each for identifying a soma judged by the judging unit as a soma that fires; an output information acquiring unit that acquires, from the output management information storage unit, output information corresponding to the firing pattern acquired by the firing pattern acquiring unit; and an information output unit that outputs the output information acquired by the output information acquiring unit, wherein the information transfer unit acquires the soma identifier of each of the one or more somas connected to the soma judged by the judging unit as a soma that fires, using the one or more pieces of feature information applied to soma-related information of the soma judged by the judging unit as a soma that fires or one or more pieces of feature information acquired from the one or more pieces of feature information, and the connection information in the connection information storage unit, and the processing by the judging unit, the processing by the firing pattern acquiring unit, and the processing by the information transfer unit are repeated twice or more.

Figure 13:
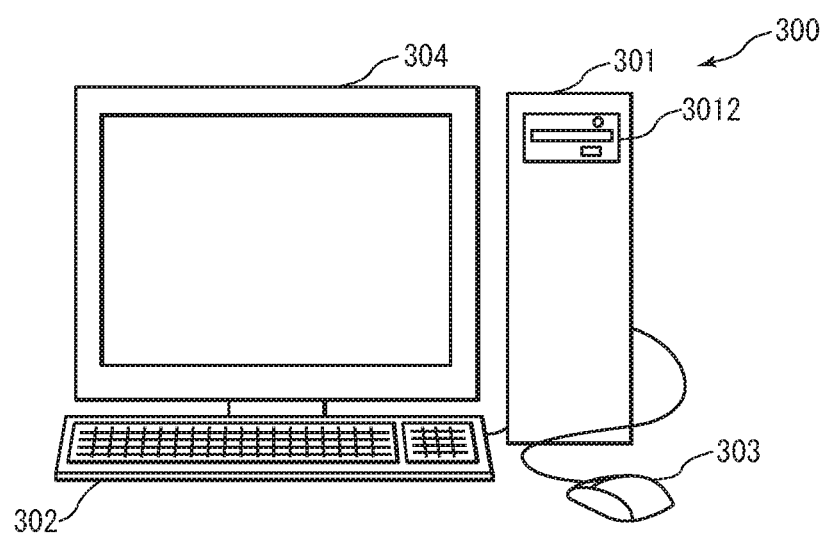
FIG. 13 is a schematic view of a computer system in the embodiment.
Figure 14:
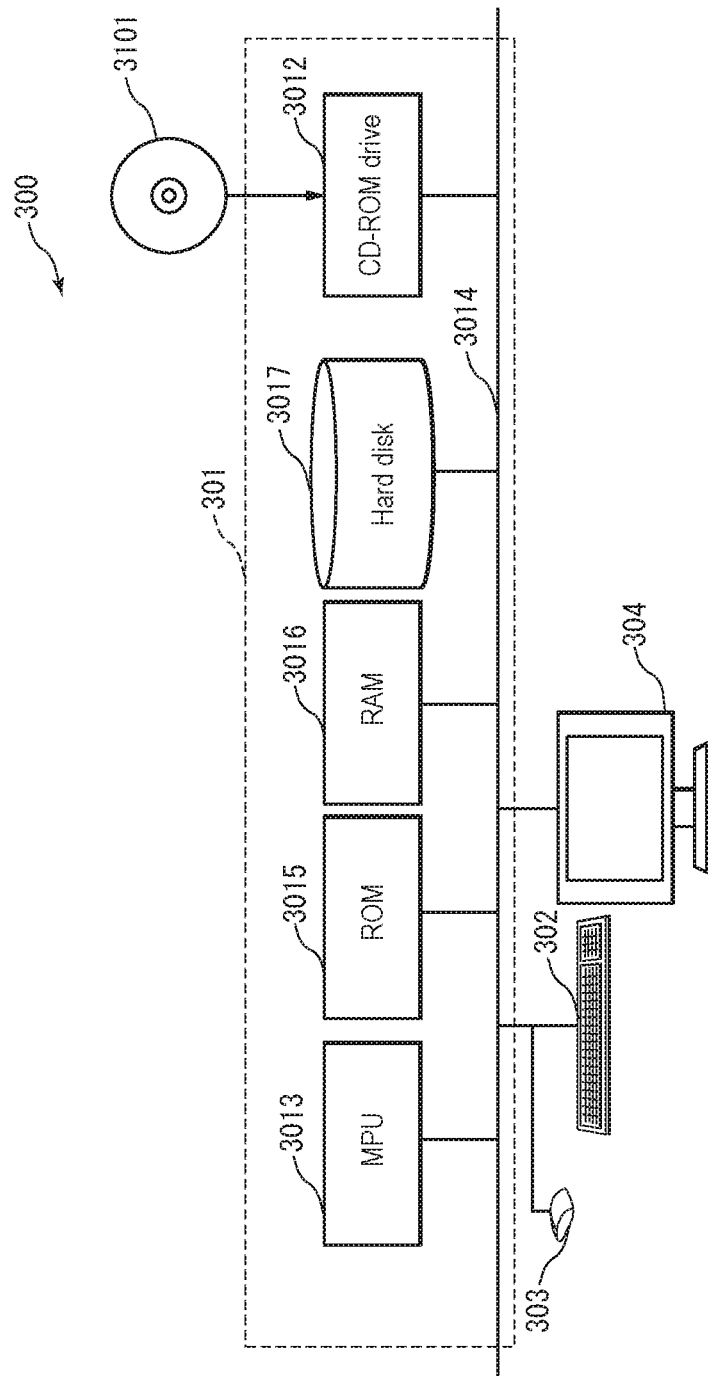
FIG. 14 is a block diagram of the computer system in the embodiment.

FIG. 13 shows the external appearance of a computer that executes the programs described in this specification to realize the information processing apparatus A in the foregoing various embodiments. The foregoing embodiments may be realized using computer hardware and a computer program executed thereon. FIG. 13 is a schematic view of a computer system 300. FIG. 14 is a block diagram of the system 300.

In FIG. 13, the computer system 300 includes a computer 301 including a CD-ROM drive 3012, a keyboard 302, a mouse 303, and a monitor 304.

In FIG. 14, the computer 301 includes the CD-ROM drive 3012, an MPU 3013, a bus 3014, a ROM 3015, a RAM 3016, and a hard disk 3017. In the ROM 3015, a program such as a boot up program is stored. The RAM 3016 is connected to the MPU 3013 and is a memory in which a command of an application program is temporarily stored and a temporary storage area is provided. In the hard disk 3017, typically an application program, a system program, and data are stored. Although not shown, the computer 301 may further include a network card that provides connection to a LAN.

The programs for causing the computer system 300 to execute the functions of the information processing apparatus A in the foregoing embodiments may be stored in a CD-ROM 3101 that is inserted into the CD-ROM drive 3012, and be transmitted to the hard disk 3017. Alternatively the programs may be transmitted via a network (not shown) to the computer 301 and stored in the hard disk 3017. At the time of execution, the programs are loaded into the RAM 3016. The programs may be loaded from the CD-ROM 3101, or directly from a network.

The programs do not necessarily have to include, for example, an operating system (OS) or a third party program to cause the computer 301 to execute the functions of the information processing apparatus A in the foregoing embodiments. The programs may only include a command portion to call an appropriate module in a controlled mode and obtain desired results. The manner in which the computer system 300 operates is well known, and thus a detailed description thereof has been omitted.

Furthermore, the computer that executes the programs may be a single computer, or may be multiple computers. That is to say centralized processing may be performed, or distributed processing may be performed.

In the foregoing embodiments, each process may be realized as centralized processing using a single apparatus, or may be realized as distributed processing using multiple apparatuses.

The present invention is not limited to the embodiment set forth herein. Various modifications are possible within the scope of the present invention.

INDUSTRIAL APPLICABILITY

As described above, the information processing apparatus according to the present invention has an effect that it is possible to realize information processing for simulating processing in the brain, and thus this apparatus is useful, for example, as an information processing apparatus and the like for performing simulation in the brain.

LIST OF REFERENCE NUMERALS

A Information processing apparatus
1 Storage unit
2 Accepting unit
3 Processing unit
5 Output unit
11 Soma-related information storage unit
12 Soma group information storage unit
13 Connection information storage unit
14 Glial cell information storage unit
15 Firing start point information storage unit
16 Output management information storage unit
17 Learning condition storage unit
18 Learning information storage unit
19 Firing information storage unit
20 Used connection information storage unit
21 Input information accepting unit
31 Feature information acquiring unit
32 Information transfer unit
33 Soma calculating unit
34 Judging unit
35 Firing probability changing unit
36 Firing pattern acquiring unit
37 Output information acquiring unit
38 Control unit
39 Learning detecting unit
40 Learning information accumulating unit
41 Growth unit
42 Apoptosis processing unit
43 Firing information accumulating unit
51 Information output unit
321. Firing start point soma determining part
322 Connection detecting part
323 Transfer information acquiring part

The invention claimed is:

1. An information processing apparatus comprising:
one or more non-transitory computer readable storages, comprising
a soma-related information storage in which two or more pieces of soma-related information having a soma identifier for identifying a soma, and firing condition information related to a condition for the soma to fire are stored;
a connection information storage in which one or more pieces of connection information for specifying connection between two or more somas are stored; and
an output management information storage in which one or more pieces of output management information having an output condition, which is a condition for output using a firing pattern having one or more soma identifiers, and output information, which is information that is output, are stored;
a processor; and
a non-transitory program memory storing a program, wherein:
the program, when executed by the processor, causes the processor to perform processing of:
accepting input information;
acquiring one or more pieces of feature information from the input information;
acquiring the one or more pieces of feature information acquired and one or more soma identifiers each for identifying a soma that fires first, and acquiring one or more pieces of feature information given from one or more other somas or one or more pieces of feature information acquired from the one or more pieces of feature information, and a soma identifier of each of one or more somas that are to be subjected to judgment of firing;
judging, using the one or more pieces of feature information acquired and firing condition information that is paired with the one or more soma identifiers acquired, whether or not the soma identified with each of the soma identifiers fires;
acquiring a firing pattern containing one or more soma identifiers each for identifying a soma judged as a soma that fires;
acquiring, from the output management information storage, output information corresponding to the firing pattern acquired; and
outputting the output information acquired,
the executed program causes the processor to perform processing of acquiring the soma identifier of each of the one or more somas connected to the soma judged as a soma that fires, using the one or more pieces of feature information applied to soma-related information of the soma judged as a soma that fires or one or more pieces of feature information acquired from the one or more pieces of feature information, and the connection information in the connection information storage, and the processing of the judging, the processing of the acquiring the firing pattern, and the processing of the acquiring the one or more pieces of feature information are repeated twice or more.

2. The information processing apparatus according to claim 1, wherein:

the one or more non-transitory computer readable storages further comprise a firing start point information storage in which one or more pieces of firing start point information having an information identifier for identifying feature information, and one or more soma identifiers each for identifying a soma that fires when the feature information is accepted are stored, and the executed program causes the processor to perform processing of, in the processing of the acquiring the one or more pieces of feature information:

acquiring one or more soma identifiers that are respectively paired with information identifiers for identifying the one or more pieces of feature information acquired, from the firing start point information storage;

detecting one or more somas connected to a soma judged as a soma that fires, using the connection information in the connection information storage; and acquiring one or more pieces of feature information applied to soma-related information of a soma judged as a soma that fires or one or more pieces of feature information acquired from the one or more pieces of feature information, and soma identifiers of one or more somas detected.

3. The information processing apparatus according to claim 1, wherein the executed program further causes the processor to perform processing of:

performing calculation on two or more pieces of feature information given from two or more other somas, thereby acquiring one piece of feature information; and acquiring, in the processing of the acquiring the one or more pieces of feature information, the one or more pieces of feature information acquired and one or more soma identifiers each for identifying a soma that fires first, and acquiring the one piece of feature information acquired and a soma identifier of each of one or more somas that are to be subjected to judgment of firing.

4. The information processing apparatus according to claim 1, wherein:

the soma-related information comprises a soma group identifier for identifying a soma group, which is a group to which a soma belongs, part of the connection information in the connection information storage is information for specifying connection between soma groups, each of which is a group of somas, and in the processing of the acquiring the one or more pieces of feature information, using the connection information for specifying connection between a soma group containing a soma judged as a soma that fires and another soma group, soma identifiers of one or more somas contained in the other soma group are acquired.

5. The information processing apparatus according to claim 1, wherein:

the soma-related information comprises one or more dendrite identifiers each for identifying a dendrite that realizes information input to a soma, and one or more axon identifiers each for identifying an axon that realizes information output from a soma, and at least some of the one or more pieces of connection information in the connection information storage comprise an axon identifier for identifying an axon of one soma and a dendrite identifier for identifying a dendrite of another soma.

6. The information processing apparatus according to claim 1, wherein:

the connection information comprises information transfer probability information related to a probability at which information transfer between one soma and another soma is performed, and in the processing of the acquiring the one or more pieces of feature information, the soma identifier of each of the one or more somas connected to the soma judged as a soma that fires is probabilistically acquired, using the information transfer probability information contained in the connection information in the connection information storage.

7. The information processing apparatus according to claim 1, wherein in the processing of the judging, it is not judged that a soma, judged as a soma that has fired, fires, as long as a length of time that has elapsed is not long enough to satisfy a predetermined condition.

8. The information processing apparatus according to claim 1, wherein:

the firing condition information comprises firing probability information related to a firing probability, in the processing of the judging, it is judged that a soma fires or judges that the soma does not fire, in a case of judging whether or not the soma fires even using same one or more pieces of feature information and a same piece of firing condition information, and the executed program further causes the processor to perform processing of changing a firing probability information corresponding to a soma judged as a soma that fires, so as to increase the firing probability.

9. The information processing apparatus according to claim 1, wherein:

the output management information is information that is a pair of an output condition, which is a condition using information related to a firing pattern and one or more pieces of external information that are information of external conditions, and output information, in the processing of the input information, one or more pieces of external information is accepted, and in the processing of the acquiring output information, an output condition that matches the one or more soma identifiers acquired and the one or more pieces of external information accepted is acquired, and output information that is paired with the output condition is acquired.

10. The information processing apparatus according to claim 1, wherein:

the one or more non-transitory computer readable storages further comprise:

a learning condition storage in which one or more learning conditions, each of which is a condition for learning using a firing pattern, are stored; and a learning information storage in which one or more pieces of learning information having input information or one or more pieces of feature information acquired from the input information, and a firing pattern, are stored, the executed program further causes the processor to perform processing of:

detecting a learning condition that the firing pattern acquired matches; and accumulating, in the case in which a matching learning condition is detected, learning information having input information from which the firing pattern acquired is obtained or one or more pieces of feature information acquired from the input information, and a firing pattern having at least some soma identifiers constituting the firing pattern acquired, in the learning information storage, in the processing of the acquiring the firing pattern, input information accepted or one or more pieces of feature information acquired from the input information are applied to one or more pieces of learning information in the learning information storage, thereby acquiring a firing pattern corresponding to the input information or the one or more pieces of feature information acquired from the input information, and in the processing of acquiring the output information, output information is acquired from the output management information storage, also using a firing pattern acquired using the one or more pieces of learning information in the learning information storage.

11. The information processing apparatus according to claim 1, wherein the executed program further causes the processor to perform processing of:

performing one or more processing of soma generation processing for generating soma-related information having a soma identifier, and accumulating the information in the soma-related information storage; connection information generation processing for generating connection information, and accumulating the information in the connection information storage; and connection information growth processing for growing connection information.

12. The information processing apparatus according to claim 11, wherein the performing the one or more processing comprises performing soma generation processing for generating soma-related information of a divided soma, which is a new soma obtained by dividing a soma judged as a soma that has fired for the number of times or at the frequency that is large enough to satisfy a predetermined condition, and accumulating the information in the soma-related information storage; and connection information generation processing for generating connection information for connecting a soma that satisfies the condition and a divided soma, and accumulating the information in the connection information storage.

13. The information processing apparatus according to claim 11, wherein:

the one or more non-transitory computer readable storages further comprise a glial cell information storage in which one or more pieces of glial cell information having a soma identifier for identifying a soma for connection, or a connection information identifier for identifying connection information for connection are stored, and the performing the one or more processing comprises performing one or more of soma generation processing for generating soma-related information of a divided soma, which is a new soma obtained by dividing a soma connected to glial cell information that satisfies a predetermined condition, and accumulating the information in the soma-related information storage; and connection information growth processing for growing an axon or a dendrite connected to glial cell information that satisfies a predetermined condition.

14. The information processing apparatus according to claim 11, wherein:

the soma-related information comprises soma positional information indicating a position of a soma, one or more pieces of dendrite information, and one or more pieces of axon information, the dendrite information comprises a dendrite identifier and dendrite positional information indicating a position of a dendrite, the axon information comprises an axon identifier and axon positional information indicating a position of an axon, at least some of the one or more pieces of connection information in the connection information storage comprise an axon identifier of an axon of one soma and a dendrite identifier of a dendrite of another soma, and the performing the one or more processing comprises performing connection information growth processing for changing the axon positional information so as to allow an axon to extend or changing the dendrite positional information so as to allow a dendrite to extend, and, in a case in which axon positional information of an axon of one soma and dendrite positional information of a dendrite of another soma are close to each other enough to satisfy a predetermined condition, performing connection information generation processing for generating connection information for specifying connection between the axon of the one soma and the dendrite of the other soma, and accumulating the information in the connection information storage.

15. The information processing apparatus according to claim 14, wherein:

the soma-related information comprises a soma group identifier for identifying a soma group, which is a group to which a soma belongs, the one or more non-transitory computer readable storages further comprise a soma group information storage in which two or more pieces of soma group information, each having a soma group identifier for identifying a soma group and goal information for specifying a destination to which an axon or a dendrite connected to a soma belonging to the soma group extends, are stored, and the performing the one or more processing comprises changing the axon positional information or the dendrite positional information such that an axon or a dendrite extends to a destination specified with the goal information contained in the soma group information of a soma group to which a soma connected to the axon or the dendrite belongs.

16. The information processing apparatus according to claim 13, wherein:

the glial cell information comprises glial cell positional information for specifying a position of a glial cell, and the performing the one or more processing comprises changing the axon positional information of an axon identified with a connection information identifier contained in the glial cell information, such that the position becomes closer to a position indicated by the glial cell positional information contained in the glial cell information.

17. The information processing apparatus according to claim 1, wherein the executed program further causes the processor to perform processing of deleting soma-related information from the soma-related information storage according to a predetermined condition.

18. The information processing apparatus according to claim 17, wherein, in a case in which the amount of soma-related information stored in the soma-related information storage is large enough to satisfy a predetermined condition, the soma-related information is deleted from the soma-related information storage.

19. The information processing apparatus according to claim 17, wherein:
the one or more non-transitory computer readable storages further comprise a firing information storage in which one or more pieces of firing information having a soma identifier for identifying a soma that has fired are stored, and
the executed program further causes the processor to perform processing of:
configuring firing information comprising a soma identifier for identifying a soma judged as a soma that fires, and accumulating the firing information in the firing information storage, and
in the processing of the deleting the soma-related information, using the one or more pieces of firing information in the firing information storage, determining a soma that is not connected to another soma, a dendrite, or an axon, determining a soma connected to an axon that does not reach a predetermined goal, or determining a soma that has fired for the number of times that is small enough to satisfy a predetermined condition, and deleting soma-related information having a soma identifier of the determined soma, from the soma-related information storage.

20. An information processing method using a non-transitory computer readable storage medium including:
a soma-related information storage in which two or more pieces of soma-related information having a soma identifier for identifying a soma, and firing condition information related to a condition for the soma to fire are stored;
a connection information storage in which one or more pieces of connection information for specifying connection between two or more somas are stored; and
an output management information storage in which one or more pieces of output management information having an output condition, which is a condition for output using a firing pattern having one or more soma identifiers, and output information, which is information that is output, are stored,
the method realized by a processor, comprising:
an input information accepting step of accepting input information;
a feature information acquiring step of acquiring one or more pieces of feature information from the input information;
a first information transfer step of acquiring the one or more pieces of feature information acquired in the feature information acquiring step and one or more soma identifiers each for identifying a soma that fires first;
a judging step of, using the one or more pieces of feature information acquired in the first information transfer step or a second information transfer step, and firing condition information that is paired with the one or more soma identifiers, judging whether or not the soma identified with each of the soma identifiers fires;
a firing pattern acquiring step of acquiring a firing pattern containing one or more soma identifiers each for identifying a soma judged in the judging step as a soma that fires;
an output information acquiring step of acquiring output information corresponding to the firing pattern acquired in the firing pattern acquiring step, from the output management information storage;
an information output step of outputting the output information acquired in the output information acquiring step; and
a second information transfer step of acquiring the soma identifier of each of the one or more somas connected to the soma judged in the judging step as a soma that fires, using the one or more pieces of feature information applied to soma-related information of the soma judged in the judging step as a soma that fires or one or more pieces of feature information acquired from the one or more pieces of feature information, and the connection information in the connection information storage,
wherein the judging step, the firing pattern acquiring step, and the second information transfer step are repeated twice or more.

21. A non-transitory computer readable storage medium storing a program including:
a soma-related information storage in which two or more pieces of soma-related information having a soma identifier for identifying a soma, and firing condition information related to a condition for the soma to fire are stored;
a connection information storage in which one or more pieces of connection information for specifying connection between two or more somas are stored; and
an output management information storage in which one or more pieces of output management information having an output condition, which is a condition for output using a firing pattern having one or more soma identifiers, and output information, which is information that is output, are stored,
the program causing a computer to perform:
an input information accepting step of acquiring input information;
a feature information acquiring step of acquiring one or more pieces of feature information from the input information;
an information transfer step of acquiring the one or more pieces of feature information acquired in the feature information acquiring step and one or more soma identifiers each for identifying a soma that fires first, and acquiring one or more pieces of feature information given from one or more other somas or one or more pieces of feature information acquired from the one or more pieces of feature information, and a soma identifier of each of one or more somas that are to be subjected to judgment of firing;
a judging step of judging, using the one or more pieces of feature information acquired in the information transfer step, and firing condition information that is paired with the one or more soma identifiers acquired in the information transfer step, whether or not the soma identified with each of the soma identifiers fires;

a firing pattern acquiring step of acquiring a firing pattern containing one or more soma identifiers each for identifying a soma judged in the judging step as a soma that fires;

an output information acquiring step of acquiring, from the output management information storage, output information corresponding to the firing pattern acquired in the firing pattern acquiring step; and an information output step of outputting the output information acquired in the output information acquiring step, wherein the information transfer step comprises acquiring the soma identifier of each of the one or more somas connected to the soma judged in the judging step as a soma that fires, using the one or more pieces of feature information applied to soma-related information of the soma judged in the judging step as a soma that fires or one or more pieces of feature information acquired from the one or more pieces of feature information, and the connection information in the connection information storage, and the judging step, the firing pattern acquiring step, and the information transfer step are repeated twice or more.

\* \* \* \* \*